United States Patent
Law et al.

(10) Patent No.: US 9,874,870 B2
(45) Date of Patent: Jan. 23, 2018

(54) METHODS AND APPARATUS TO MANAGE TESTING OF A PROCESS CONTROL SYSTEM

(75) Inventors: Gary Keith Law, Georgetown, TX (US); Godfrey R. Sherriff, Austin, TX (US); Mark Nixon, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 819 days.

(21) Appl. No.: 12/548,197

(22) Filed: Aug. 26, 2009

(65) Prior Publication Data

US 2011/0054643 A1 Mar. 3, 2011

(51) Int. Cl.
*G05B 23/02* (2006.01)
*G06F 9/44* (2006.01)
*G06F 11/36* (2006.01)

(52) U.S. Cl.
CPC ...... *G05B 23/0256* (2013.01); *G06F 11/3636* (2013.01)

(58) Field of Classification Search
CPC ............ G06F 11/3636; G06F 11/3688; G06F 11/3692; G06F 22/865
USPC ................................................. 717/125, 131
See application file for complete search history.

(56) References Cited

U.S. PATENT DOCUMENTS

| 5,513,315 A * | 4/1996 | Tierney et al. .................. 714/37 |
| 5,659,547 A | 8/1997 | Scarr et al. |
| 5,754,755 A | 5/1998 | Smith, Jr. |
| 5,818,736 A * | 10/1998 | Leibold ........................... 703/16 |
| 6,002,869 A * | 12/1999 | Hinckley ....................... 717/124 |
| 6,081,752 A * | 6/2000 | Benson, IV .............. G06F 1/30 700/79 |
| 6,308,293 B1 * | 10/2001 | Shimono ....................... 714/741 |
| 6,542,841 B1 | 4/2003 | Synder |
| 6,862,547 B2 | 3/2005 | Snowbarger et al. |
| 6,898,784 B1 | 5/2005 | Kossatchev et al. |

(Continued)

FOREIGN PATENT DOCUMENTS

| CN | 1509428 | 6/2004 |
| GB | 2400456 | 10/2004 |

(Continued)

OTHER PUBLICATIONS

Csallner et al., "Check 'n' Crash: Combining Static Checking and Testing", ACM, 2005, 10pg.*

(Continued)

*Primary Examiner* — Ryan Coyer
(74) *Attorney, Agent, or Firm* — Hanley, Flight & Zimmerman, LLC

(57) ABSTRACT

Example methods and apparatus to manage testing of a process control system are disclosed. A disclosed example method includes generating a test application from a process control routine, the test application including at least one test that is to be performed within a time period, monitoring an operation of the process control routine, determining if the operation of the process control routine during the time period includes an execution of a portion of the process control routine that is substantially similar to the at least one test, and updating the test application by indicating that the at least one test has been performed within the time period.

37 Claims, 11 Drawing Sheets

(56) References Cited

U.S. PATENT DOCUMENTS

| | | | |
|---|---|---|---|
| 6,959,431 B1* | 10/2005 | Shiels et al. | 717/124 |
| 7,076,713 B1 | 7/2006 | Hess | |
| 7,079,021 B2 | 7/2006 | Snowbarger et al. | |
| 7,380,170 B2* | 5/2008 | Sluiman et al. | 714/38.14 |
| 7,415,635 B1* | 8/2008 | Annangi | 714/38.12 |
| 7,506,212 B2* | 3/2009 | Ramamurthy et al. | 714/38.14 |
| 7,621,293 B2 | 11/2009 | Snowbarger | |
| 7,673,288 B1* | 3/2010 | Stroomer | 717/124 |
| 7,882,495 B2* | 2/2011 | Tillmann et al. | 717/124 |
| 8,104,495 B2 | 1/2012 | Snowbarger | |
| 8,684,021 B2 | 4/2014 | Snowbarger | |
| 2002/0145515 A1 | 10/2002 | Snowbarger et al. | |
| 2003/0233216 A1* | 12/2003 | Ouchi | 702/186 |
| 2004/0061517 A1* | 4/2004 | Stirrat et al. | 324/765 |
| 2004/0199364 A1* | 10/2004 | Law et al. | 702/189 |
| 2005/0165597 A1* | 7/2005 | Nightingale | 703/27 |
| 2006/0174165 A1* | 8/2006 | Shaffer et al. | 714/47 |
| 2006/0184918 A1* | 8/2006 | Rosaria et al. | 717/124 |
| 2007/0260950 A1* | 11/2007 | Morrison et al. | 714/726 |
| 2008/0098361 A1* | 4/2008 | Kumar et al. | 717/128 |
| 2009/0182534 A1* | 7/2009 | Loboz | 702/186 |
| 2009/0265300 A1* | 10/2009 | Balog | 706/60 |
| 2010/0030361 A1* | 2/2010 | Gaines et al. | 700/110 |
| 2010/0083036 A1* | 4/2010 | Calinoiu et al. | 714/5 |
| 2010/0131930 A1* | 5/2010 | Ben-Chaim et al. | 717/127 |
| 2010/0280785 A1* | 11/2010 | Buard et al. | 702/120 |
| 2011/0022444 A1* | 1/2011 | Fridman et al. | 705/10 |

FOREIGN PATENT DOCUMENTS

| | | |
|---|---|---|
| JP | H07-319533 | 12/1995 |
| JP | 2005-025631 | 1/2005 |

OTHER PUBLICATIONS

Berner et al., "Observations and Lessons Learned from Automated Testing," ACM, 2005, 9pg.*

Balci, Osman, "Validation, verification, and testing techniques throughout the life cycle of a simulation study," J.C. Baltzer AG, Annals of Operations Research vol. 53, 1994, p. 121-173.*

Search Report under Section 17(5), issued by British Intellectual Property Office in connection with British Patent Application No. BG1014179.4, dated Nov. 30, 2010, 3 pages.

State Intellectual Property Office of China, "First Office Action," issued in connection with application No. CN 201010265462.8, dated Nov. 26, 2013, 9 pages.

State Intellectual Property Office of China, "Second Office Action," issued in connection with application No. CN 201010265462.8, dated May 16, 2014, 4 pages.

Japanese Patent Office, "Reasons for Rejection," issued in connection with application No. JP 2010-188123, dated May 20, 2014, 2 pages.

Intellectual Property Office of the United Kingdom, "Examination Report", issued in connection with application No. GB1014179.4 dated May 21, 2015, 3 pages.

Intellectual Property Office of the United Kingdom, "Examination Report," issued in connection with application No. GB1014179.4 dated Feb. 26, 2016, 5 pages.

State Intellectual Property Office of China, "Search Report," issued in connection with application No. CN 201010265462.8, dated Nov. 14, 2013, 1 page.

* cited by examiner

103
TEST APPLICATION PID1

| TEST ID | TEST NAME | NEXT VERIFY DATE |
|---------|-----------|------------------|
| TEST 01 | FT-101 OUT LIMIT | 12/22/09 |
| TEST 02 | BKCAL_IN LIMIT | 11/15/09 |
| TEST 03 | BKCAL_IN RATE | 11/15/09 |
| TEST 04 | PID1 FUNCTION 1 | 11/15/09 |
| TEST 05 | PID1 FUNCTION 2 | *10/30/09* |
| TEST 06 | PID1 OUT LIMIT | 5/13/10 |
| TEST 07 | FY-101 FUNCTION 1 | *10/30/09* |
| TEST 08 | FY-101 BKCAL_OUT LIMIT | 11/15/09 |
| TEST 09 | FY-101 OUT TRIGGER | 12/22/09 |
| TEST 10 | ALARM1 ACTIVATE | 11/15/09 |

402
FT-101 OUT LIMIT (TEST01)

| TEST ID | TEST | MITIGATION | NEXT VERIFY DATE |
|---------|------|------------|------------------|
| TEST 01H | FT-101 OUT $\leq$ 25.2 | 1. SEND ISSUE INDICATOR 02<br>2. REDUCE FT-101 OUT TO BELOW LIMIT W/ 60 SEC | 4/26/10 |
| TEST 01L | FT-101 OUT $\geq$ 21.7 | 1. SEND ISSUE INDICATOR 04<br>2. INCREASE FT-101 OUT TO ABOVE LIMIT W/ 60 SEC | 2/14/10 |
| TEST 01N | FT-101 OUT = DEC | 1. SEND ISSUE INDICATOR 09<br>2. REESTABLISH COMM WITH CONTROLLER | 12/22/09 |

FIG. 4

| TEST HISTORY FT-101 OUT LIMIT (TEST01L) | | | | | |
|---|---|---|---|---|---|
| TEST DATE | TEST VERSION | TEST TYPE | MITIGATION TIME | OPERATOR | NEXT VERIFY DATE |
| 5/15/08 | VER. 1.5A | ☐ MANUAL<br>☒ IN PROCESS<br>☐ AUTOMATIC<br>☐ SIMULATION | 34 SEC | GKL01 | 11/15/08 |
| 11/15/08 | VER. 1.5A | ☒ MANUAL<br>☐ IN PROCESS<br>☐ AUTOMATIC<br>☐ SIMULATION | 11 SEC | GKL01 | 5/15/08 |
| 5/15/09 | VER. 2.0A | ☐ MANUAL<br>☐ IN PROCESS<br>☒ AUTOMATIC<br>☐ SIMULATION | 22 SEC | EM02 | 11/15/09 |
| 8/14/09 | VER. 2.0A | ☐ MANUAL<br>☒ IN PROCESS<br>☐ AUTOMATIC<br>☐ SIMULATION | 49 SEC | GKL01 | 2/14/10 |

FIG. 5

| OPERATOR TRAINING RECORD 602 | | | | |
|---|---|---|---|---|
| OPERATOR ID | TRAINING LEVEL | RECERTIFICATION DATE | AUTHORIZED PROCESS CONTROL AREAS | ASSIGNED TRAINING NOT COMPLETED |
| GKL01 | LEVEL 5 | 11/25/09 | PID1, LINES 2-7 | FD 101, ASM 332 |
| EM02 | LEVEL 4 | 12/25/09 | PID1, PID2 | PDM 202, PDM 203, ASM 332, MEMS 432 |
| GRS07 | LEVEL 2 | 1/2/10 | EOL ZONES | ELE 655 |
| MN04 | LEVEL S | 3/3/10 | ALL | NONE |

FIG. 6

METHODS AND APPARATUS TO MANAGE TESTING OF A PROCESS CONTROL SYSTEM

FIELD OF THE DISCLOSURE

The present disclosure relates generally to process control systems and, more particularly, to methods and apparatus to manage testing of a process control system.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies or routines using the field devices via the buses and/or other communication links communicatively coupling the field devices.

Information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more strategies, routines, or applications that perform campaign management functions, maintenance management functions, virtual control functions, diagnostic functions, real-time monitoring functions, safety-related functions, configuration functions, etc. within the process control system.

Process control systems typically implement strategies, routines, or applications that require periodic testing to verify the strategies, routines, or applications are performing as designed or specified. For example, an application that includes a sensor and an actuator may be verified by varying an input of the sensor to cause the application to drive the actuator. Applying simulated sensor input values to an application and/or applying simulated values to actuators may be sufficient to verify an application and save testing time but may not be sufficient to verify the actual and physical operation of the sensor and/or the actuator. Currently, to verify an application or a process control system, an operator may manually provide inputs to sensors and record the positions of the corresponding actuators. However, this manual verification process may be time consuming because the operator may only perform one test at a time.

Additionally, the verification process may require a shutdown of the application or process control system, resulting in a loss of productivity.

SUMMARY

Example methods and apparatus to manage testing of a process control system are described. In one example, a method includes generating a test application from a process control routine, wherein the test application includes at least one test that is to be performed within a time period. The example method further includes monitoring an operation of the process control routine, determining if the operation of the process control routine during the time period includes an execution of a portion of the process control routine that is substantially similar to the at least one test, and updating the test application by indicating that the at least one test has been performed within the time period.

An example apparatus includes a routine monitor to monitor an operation of a process control routine and a test application comparer to determine if the operation of the process control routine during a time period includes an execution of a portion of the process control routine that is substantially similar to at least one test that is included within a test application, wherein the at least one test is to be performed within the time period. The example apparatus further includes a test application modifier to update the test application by indicating that the at least one test has been performed within the time period. In some examples, the example apparatus my also include a test application generator to generate a test application from the process control routine.

BRIEF DESCRIPTION OF THE DRAWINGS

FIG. 4 shows the example test application of FIG. 3 and a test description table for an example test.

FIG. 5 shows a verification history of the example test TEST01L in FIG. 4.

FIG. 6 shows an example operator training record for the process control system of and/or the process control routine of FIG. 1.

DETAILED DESCRIPTION

Figure 1:
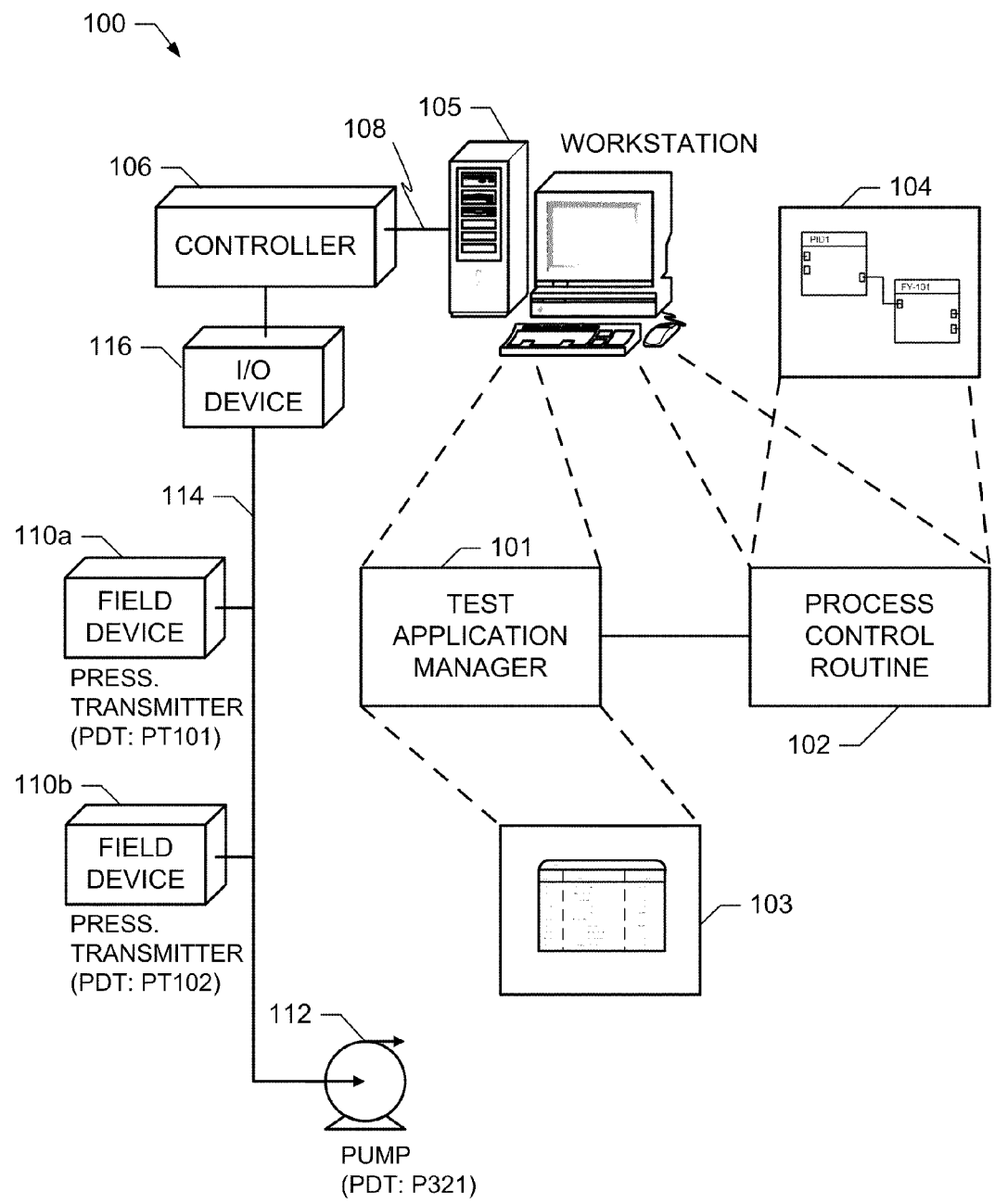
FIG. 1 is a block diagram illustrating an example process control system including an example test application manager.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with testing a process control system, the example method and apparatus are more generally applicable and may be implanted to test and/or verify any automation system, batch processing system, manufacturing system, industrial control system, safety instrumented system, etc.

Typically, process control system designers implement a control strategy, routine, algorithm, and/or application to operate a process control system. Process control test designers may then create test procedures to test the process control system based at least partially on the control strategy, algorithm, routine, and/or application. Thus, test designers create test procedures and system designers implement control routines and, as a result, process control systems usually include systems and/or routines that are independent from one or more corresponding test procedures. This independence may result in a modification to a process control system and/or routine that may not be reflected in a corresponding test procedure which, in turn, may result in the modification not being properly verified or verifiable by the test procedure. However, process control systems commonly implement routines that may require periodic testing to verify the routines are performing as designed or specified. Thus, a possibility exists that the unverified modification may experience issues and/or failures at a higher rate than other verified or verifiable portions of the strategy, routine, and/or application.

Additionally, because process control routines and corresponding test procedures are often independent from each other, the test procedure is generally executed by a process control operator while the process control routine is suspended. As noted above, to verify a process control system and/or a routine, an operator may manually provide inputs to some field devices within the process control system and record the outputs of other corresponding field devices within the process control system. However, this manual verification process may be time consuming because the operator may only be capable of performing one test at a time (i.e., serially). Additionally, the verification process may require a shutdown of the process control system, which may not be possible or practical and/or may result in a loss of productivity.

Further, any process control operator may attempt to verify one or more process control routines. However, in some cases the operator may not have the proper training to conduct the verification. An operator without proper training may improperly perform a test and/or may incorrectly record the results of a test resulting in an unverified routine and/or process control field devices. Over time, the unverified routine or field devices may experience a preventable failure that results in a decline of product quality, process quality, and/or a stoppage of the process to correct the failure.

The example methods and apparatus described herein combine process control routines and/or the operation of process control systems with corresponding test procedures to optimize the management of testing of the routines and/or the process control systems. More specifically, the example methods and apparatus described herein may generate a test procedure (e.g., a test application) from or based on a process control strategy, routine, algorithm, and/or application. In some examples, tests within the test application may be combined with and/or added to other tests in a test database based on a test type.

The example methods and apparatus may then monitor the strategy, routine, algorithm, and/or application to determine if an event occurs that is substantially similar to one or more tests within the test application. If an event occurs that is substantially similar to one or more tests, the example methods and apparatus determine if the event was properly mitigated. If the event was properly mitigated by the process control system, the example methods and apparatus may then update the test application by indicating the one or more tests have been verified. By automatically updating the test application, the example methods and apparatus optimize test time by documenting which tests do not need to be verified because they have been effectively verified during the routine or normal operation of the process control system.

The example methods and apparatus may determine an event (e.g., an execution of a portion of a process control routine) is substantially similar to one or more tests by comparing parameters, functions, and/or field devices associated with the event to parameters, functions, and/or field devices specified within the one or more tests. For example, a process control routine may include a parameter from a sensor that corresponds to an input measured by the sensor that is part of a processing function. A test application may include a test that verifies the complete input range (e.g., 0.5 bar to 35 bar) of the sensor. The test may be divided by partitioning the input range of the sensor into a test for a low range of inputs (e.g., 0.5 bar to 10 bar) to the senor and a test for a high range inputs (e.g., 10 bar to 35 bar) to the sensor. During the execution of the process control routine, the sensor may receive an input (e.g., 2 bar) that is within the low range of the sensor. When such an input is received, the example methods and apparatus may match this event to the low range sensor test. Then, if the example methods and apparatus determine there was a proper mitigation of the event (e.g., increasing the input measured by the sensor) within the process control routine based on the low range of the sensor, the low range sensor test may be updated to reflect the completion of the test. The example methods and apparatus may also indicate a next verification date for the low range sensor test, where the next verification date may be based on a time increment (e.g., six months from a date of competition) that is based on the type of test.

A proper mitigation of a process control event, a process control issue, and/or an execution of a portion of a process control routine may include a specified response to correct the event and/or issue. For example, the above-mentioned routine with the corresponding sensor may include an instruction to increase a pump speed by an amount that is a function of the low range of the sensor input. Upon the sensor receiving an input that corresponds to the low range of the sensor, the example methods and apparatus may determine if the routine increases the pump speed by an amount that is a function of the sensed input. If the example methods and apparatus determine the routine properly increased the pump speed, the methods and apparatus may indicate the event was properly mitigated and record the verification of the low range sensor test.

Further, because the example methods and apparatus combine a test application with a corresponding process control routine, changes or modifications made to the routine may be reflected within the test application upon the implementation of the modification. Additionally, the example methods and apparatus may monitor test applications to determine if one or more tests are specified to be verified by a specific date. In examples when one or more tests within a test application must be verified by a certain date, the example methods and apparatus may generate a test plan to guide an operator through the verification process. The example methods and apparatus may receive any process control data related to the verification procedure and use this data as part of a test proof for the test plan.

Additionally, the example methods and apparatus may determine that an operator is properly trained to execute a given test plan. For example, an operator may log into a process control system to execute a test plan. The example methods and apparatus may use an identification value provided by the operator to cross-reference a database with training records to determine if the operator may (e.g., has permission or is qualified to) perform the training plan. If the operator does not have the appropriate qualifications, the example methods and apparatus may provide the operator with a list and/or with references to training that the operator may complete prior to executing the test plan. Thus, the example methods and apparatus may be used in a process control environment to structure operator training and/or configure training levels based on prerequisite training classes and/or exercises. Further, by logging the identity of the operator that completes a test plan, the example methods and apparatus provide a documentation system that may be used to troubleshoot any future events and/or issues based on the identity of the operator that preformed the test plan.

FIG. 1 is a block diagram showing an example process control system 100 including an example test application manager 101. The test application manager 101 relates test procedures with process control routines. In the example of FIG. 1, the test application manager 101 generates a test application 103 from a process control routine 102. The process control routine 102 includes a visual object diagram 104 that may be displayed within a workstation 105 (e.g., an application station, an operator station, etc.). The workstation 105 is communicatively coupled to a process control controller 106 via a local area network (LAN) 108 (e.g., an application control network (ACN). In this example, the test application manager 101 and the process control routine 102 are implemented within the workstation 105. Alternatively or additionally, the test application manager 101 and/or the process control routine 102 may be implemented within the controller 106 to manage, test, and/or operate process control routines or applications.

The workstation 105 may be configured to perform operations associated with one or more information technology applications, user-interactive applications, and/or communication applications. For example, the workstation 105 may be configured to perform operations associated with process control-related applications and communication applications that enable the workstation 105 and the controller 106 to communicate with other devices or systems using any desired communication media (e.g., wireless, hardwired, etc.) and protocols (e.g., Hypertext Transfer Protocol (HTTP), Simple Object Access Protocol (SOAP), etc.). The workstation 105 may also be configured to create, manage, test, and/or modify process control processes via or within a graphical interface from the parameters and/or functions of the process control routine 102. The workstation 105 may be implemented using any suitable computer system or processing system (e.g., the processor system P10 of FIG. 10).

For example, the workstation 105 could be implemented using a single processor personal computer, single or multi-processor workstations, etc.

The LAN 108 that couples the workstation 105 to the controller 106 may be implemented using any desired communication medium and protocol. For example, the LAN 108 may be based on a hardwired or wireless Ethernet communication scheme. However, any other suitable communication medium and protocol could be used. Furthermore, although a single LAN is shown, more than one LAN and appropriate communication hardware within the workstation 105 may be used to provide redundant communication paths between the workstation 105 and a respective similar workstation (not shown).

In the example process control system 100 of FIG. 1, the example workstation 105 enables a process control operator to view, modify, and/or test process control data processed by the controller 106. The controller 106 may perform one or more process control routines that have been generated by a system engineer or other system personnel using the workstation 105 or any other workstation and which have been downloaded to and instantiated in the controller 106. The controller 106 may be, for example, a DeltaV™ controller sold by Fisher-Rosemount Systems, Inc., an Emerson Process Management company. However, any other controller may be used instead. Further, while only one controller is shown in FIG. 1, additional controllers of any desired type or combination of types can be coupled to the LAN 108.

The controller 106 may be coupled to a plurality of process control devices including field devices 110a-b and a pump 112 via a digital data bus 114 and an input/output (I/O) device 116. During execution of a process control routine, the controller 106 may exchange information (e.g., commands, configuration information, measurement information, status information, etc.) with the field devices 110a-b and the pump 112. This information may include parameters within process control routine functions. For example, the controller 106 may be provided with a process control routine that, when executed by the controller 106, causes the controller 106 to send commands to the field devices 110a-b and the pump 112 that cause the field devices 110a-b and the pump 112 to perform specified operations (e.g., perform a measurement, open/close a valve, enable/disable, etc.) and/or to communicate information (e.g., measurement data) via the digital data bus 114 to the controller 106. The workstation 105 may then access the information via the controller 106.

In the illustrated example of FIG. 1, the process control routine 102 is configured at the workstation 105 to define properties and configuration information to control and/or interface with the pump 112. The pump 112 may be controlled via the process control routine 102, which may be implemented within and/or executed by the controller 106. Additionally, the process control routine 102 defines properties and configuration information to control and/or interface with the field devices 110a-b. The field devices 110a-b may be any type of process control device(s) including any type(s) of sensors or measurement devices, actuators, etc. Additionally, the field devices 110a-b may include process control equipment such as, for example, tanks, vats, mixers, boilers, heaters, etc.

In the illustrated example of FIG. 1, the field devices 110a-b and 112 are fieldbus compliant devices configured to communicate via the digital data bus 114 using the well-known Foundation™ Fieldbus protocol. In accordance with the Foundation™ Fieldbus protocol, the digital data bus 114 is a digital, two-way, multi-drop communication bus configured to be communicatively coupled to measurement and control devices (e.g., the devices 110a-b and 112). In the illustrated example, the I/O device 116 is implemented using an I/O subsystem interface that enables the controller 106 and the devices 110a-b and 112 to be communicatively coupled to other field devices, which may use the Fieldbus protocol or other types of communication protocols (e.g., Profibus protocol, HART protocol, etc.). For example, the I/O device 116 may include one or more gateways that translate between the Fieldbus protocol and one or more other communication protocol(s). Additional I/O devices (similar or identical to the I/O device 116) may be coupled to the controller 106 to enable additional groups of field devices to communicate with the controller 106.

The process control routine 102 may include a set of instructions to manage and/or operate the field devices 110a-b and 112 via the I/O device 116. The process control routine 102 may include process monitoring applications, alarm management applications, process trending and/or history applications, batch processing and/or campaign management applications, statistical applications, streaming video applications, advanced control applications, etc. The controller 106 may include the process control routine 102 to control and/or manage a process control routine. An operator of the workstation 105 may modify and/or view the process control routine 102 and/or data associated with the process control routine 102. For example, an operator using the workstation 105 may modify and/or access the process control routine 102 and/or data through the visual object diagram 104.

The visual object diagram 104 includes interconnected functional blocks that represent and/or comprise the process control routine 102 (e.g., process control strategies, logic, algorithms, applications, etc.). Each functional block may be defined to implement one or more process control functions and/or applications. For example, functional blocks may receive inputs from a process control system, generate outputs for the process control system, calculate parameter values based on process control inputs and/or other parameter values, monitor inputs and/or parameters, store inputs and/or parameter values, and/or calculate control actions.

The visual object diagram 104 is a graphical representation of the process control routine 102. The functionality associated with the functional blocks is implemented as part of the process control routine 102 by the workstation 105 and/or the controller 106. Thus, when a user accesses process control data and/or modifies one or more functional blocks, the workstation 105 and/or the controller 106 coordinates the modifications between the visual object diagram 104 and the process control routine 102. In other implementations, the workstation 105 may compile a modified visual object diagram (e.g., the visual object diagram 104) into a modified process control routine 102 and store the modified process control routine 102 in the controller 106.

The functional blocks within the visual object diagram 104 may be organized in a hierarchical structure with primary functional blocks coupled to other primary and/or secondary functional blocks. Each of the secondary functional blocks may further be coupled to sub-level functional blocks with each of the sub-level functional blocks coupled to lower level functional blocks, etc.

In general, the example test application manager 101 of FIG. 1 accesses the process control routine 102 to generate the test application 103 and monitors the process control routine 102 for events that may correspond to a test within the test application 103. The test application manager 101 may access the process control routine 102 within the workstation 105 or, alternatively, via the LAN 108 in cases where the process control routine 102 is implemented within the controller 106 and the test application manager 101 is implemented within the workstation 105.

Upon the creation of the process control routine 102, the test application manager 101 may generate the corresponding test application 103. In other examples, the test application manager 101 may generate the test application 103 in response to an instruction from a process control operator or other personnel. The example test application manager 101 may generate the test application 103 by accessing the visual object diagram 104 and constructing individual tests based on the organization of the functional blocks, the parameters associated with the functional blocks, limits of the parameters, and/or functions (e.g., function types) of the functional blocks.

For example, the visual object diagram 104 may include a functional block that receives a parameter value from the field device 110a, determines if the parameter value exceeds, falls below, and/or otherwise deviates from a threshold value (e.g., a maximum value, a minimum value, a limit, etc.), and if the parameter value deviates from the threshold, sends an instruction to another functional block to correct the deviation (e.g., a process control issue resulting from the parameter value deviating from the threshold). The parameter value may be associated with an output from the field device 110a that measures an environmental component of the process control system 100. In this case, the example test application manager 101 may generate a test based on the threshold value of the parameter within the functional block. Further, the test application manager 101 may generate tests based on an input measurement range of the field device 110a, an output range of the field device 110a, and/or the function within the functional block that generates the instruction based on the output from the field device 110a. Specifically, if the specified input measurement range of the field device 110a is from 0.5 bar to 35 bar, the test application manager 101 may generate a test to verify that the field device 110a can accurately measure inputs from 0.5 bar to 35 bar.

The example test application 103 may be a test procedure and/or a test plan that includes a sequence of tests for verifying the operational capacity of the field devices 110a-b, the pump 112, the I/O device 116, and/or the controller 106 within the process control system 100. The test application 103 may also include tests for verifying that functions, algorithms, processes, and/or calculations within the process control routine 102 perform to within specified standards. Each test within the test application 103 may include sub-tests that may correspond more specifically to actual possible events and/or issues of the process control system 100. For example, a test that verifies the input range of the field device 110a from 0.5 bar to 35 bar may be subdivided into a test that verifies a lower input range (e.g., 0.5 bar to 2 bar) and a test that verifies a higher input range (e.g., 33 bar to 35 bar). In this manner, a portion of the test may verified when the field device 110a receives a relatively low input value (e.g., 1 bar), and the other portion of the test may be verified separately when the field device 110a receives a relatively high input value (e.g., 34 bar).

Further, the example test application 103 may be stored within a database and organized as a sequence of individual tests. Each test may include data fields corresponding to a test completion time (e.g., a date, month, year, hours, minutes, and/or seconds) and/or data fields for storing a proof of a test. The proof of a test may include process control data used for verifying the process control routine 102 and/or process control data used for verifying the components (e.g., the field devices 110a-b) within the process control system 100. For example, the field device 110a may measure a value of 0.6 bar that is used by the test application manager 101 to verify a low input range test. The value 0.6 bar may be stored in a data field as proof of the test. Additionally, a time-stamp of the measurement of the value 0.6 bar and/or an identification value (e.g., PT101) of the field device 110a may be included within a proof of test data field.

Further, in examples where the process control routine 102 is modified, the example test application manager 101 detects the modified process control routine 102 and automatically updates the test application 103 accordingly. The test application manager 101 may periodically check for modifications to the process control routine 102 or, alternatively, the test application manager 101 may receive a message from the process control routine 102 or any associated components within the workstation 105 indicating the process control routine 102 has been modified. By automatically updating the test application 103 as the process control routine 102 is modified, the example test application manager 101 ensures there is completed, effective test coverage for the routine 102.

In operation, the example test application manager 101 monitors the operation of the process control routine 102 for events, issues, and/or executions of portions of the process control routine 102 that may be substantially similar to tests within the test application 103. In some examples, the test application manager 101 may monitor the communication between the controller 106 and the field devices 110a-b for events and/or issues. Alternatively or additionally, the test application manager 101 may monitor the routine 102 within the controller 106 and/or the workstation 105. By monitoring the process control routine 102, the test application manager 101 may determine that the normal operation of the process control system 100 may be used to verify the completion of one or more of the tests within the test application 103. Verifying tests during the normal operation of the process control system 100 may reduce total or overall test time by ensuring only tests corresponding to unverified portions of the process control routine 102 are executed by an operator during designated verification times.

The example test application manager 101 may determine if an event, issue, and/or an execution of a portion of the process control routine 102 is substantially similar to a test within the test application 103 by cross-referencing parameters, field devices, functions, and/or functional blocks that are associated with the event, issue, and/or an execution of a portion of the process control routine 102 to information that is included within the test and which may have been used to generate the test. For example, the test to verify the input range of the field device 110a may include an identifier of the field device (e.g., PT101) 10a, an identifier and/or a link to a parameter associated with the input of the field device 110a, a location within the process control routine 102 corresponding to field device 110a input, and/or an identifier of a functional block that receives the parameter associated with the field device 110a input. The test application manager 101 may monitor the process control routine 102 for instances when the routine 102 receives data from any of these identifiers. The test application manager 101 may then determine if the received data is within the limits of the corresponding test. For example, an input to the field device 110a of 10 bar may not be sufficient to verify the lower input range test of 0.5 bar to 2 bar.

Upon determining that an event, issue, and/or an execution of a portion of the process control routine 102 is substantially similar to a test within the test application 103, the example test application manager 101 may determine if a proper mitigation of the issue and/or event occurred. A proper mitigation includes a specified resolution to correct the event and/or issue. Each test may include specified conditions for a proper mitigation or, alternatively, the test application manager 101 may determine that a proper mitigation occurred based on whether the process control routine 102 stops indicating the occurrence or presence of the issue and/or deselects or de-asserts an error flag associated with the issue. If the test application manager 101 determines a proper mitigation occurred for an issue, the test application manager 101 may then update the test application by indicating the corresponding test was completed. The indication may include proof of the test, a time-stamp of when the test occurred, the mitigation that occurred, and/or the field devices associated with the issue. The test application manager 101 may also determine a new time for the next test to be completed. For example, the test application manager 101 may determine that a test is to be completed every six months. Thus, if a test is completed May 13, 2009, the test application manager 101 may determine the next test time is Nov. 13, 2009.

The example test application manager 101 may also monitor the completion of tests within the test application 103 and send instructions to an operator to complete any tests with an approaching and/or expired completion time (e.g., any tests not completed within a specified or predetermined time period). Alternatively, the test application manager 101 may generate a test plan or test procedure of tests to be conducted by an operator at specified verification times. The test application manager 101 may filter tests to be included within the test plan based on which tests have already been completed during the normal operation of the process control system 100.

The example test application manager 101 of FIG. 1 may manage the completion of the test plan by directing an operator through the test sequence and/or through the individual steps to complete a test. Additionally, the test application manager 101 may prompt the operator for test results and/or test proofs and/or record the identification associated with the operator conducting the test. Further, the test application manager 101 may allow an operator to enter test deviations and/or to manually report test results based on tests that are specified to be verified in these manners. The test application manager 101 may also indicate which tests in the test plan may be optional or mandatory to execute by filtering the test plan. Additionally, the test application manager 101 may indicate a priority of tests to be executed in the test plan with already completed tests being assigned a lower priority. Additionally, the test application manager 101 may receive process control data associated with the executed tests and may populate the data into the corresponding test proof data fields. Further, the test application manager 101 may combine the results or test proofs from the tests conducted by an operator within already completed tests to form a complete test record within the test application 103. Also, the test application manager 101 may update each test with a new verification time (e.g., a new time period to conduct the test).

The example test application manager 101 may also manage the privileges of operators to execute the test plans and/or procedures. For example, the test application manager 101 may prompt an operator for an identification value prior to providing a test plan. Then, the test application manager 101 may access a database to determine if the operator is authorized to conduct process control tests. The database may include a training record for the operator that may include, for example, a training level of an operator, training classes completed by an operator, authorized tests associated with an operator, authorized process control areas for an operator, prerequisite training to achieve a next training level and/or area, etc. Additionally, the test application manager 101 may filter the tests in the test plan based on tests the operator is authorized to conduct. Thus, in this manner, the test application manager 101 provides a framework to integrate process control operator training records with access to process control test procedures.

The example process control system 100 is provided to illustrate one type of system within which the example methods and apparatus described in greater detail below may be advantageously employed. However, the example methods and apparatus described herein may, if desired, be advantageously employed in other systems of greater or less complexity than the example process control system 100 shown in FIG. 1 and/or systems that are used in connection with process control activities, automation activities, industrial activities, enterprise management activities, communication activities, safety activities, etc.

Figure 2:
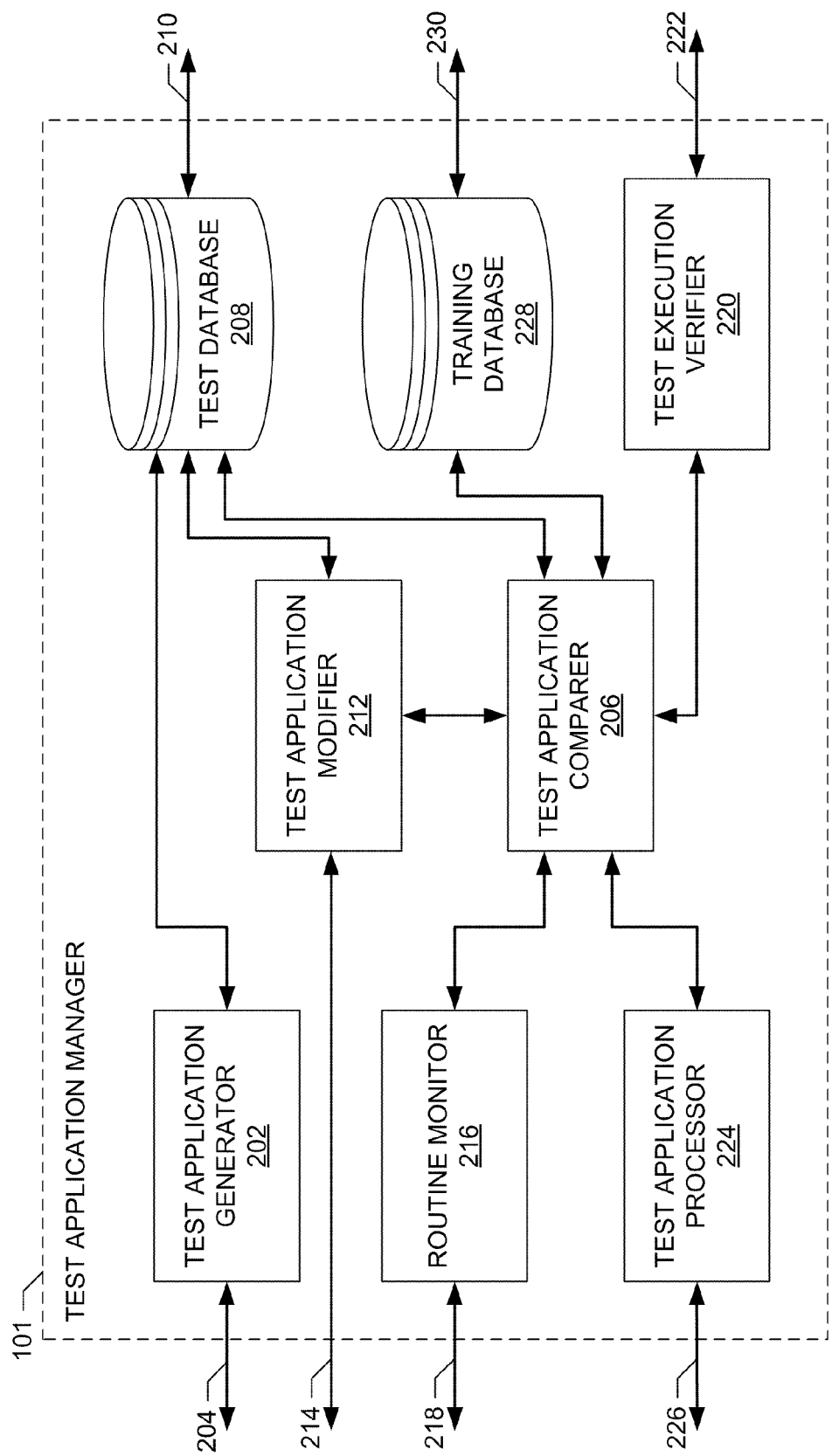
FIG. 2 is a functional diagram of the example test application manager of FIG. 1.

FIG. 2 is a functional diagram of the example test application manager 101 of FIG. 1. The example test application manager 101 includes functional blocks for generating test applications, monitoring process control routines, updating test applications with completed tests, managing the completion of tests by an operator, and/or integrating operator training with access to test plans. While the example test application manager 101 includes functional blocks configured to execute processes, the test application manager 101 may combine functional blocks or include additional functional blocks. In some examples, the test application manager 101 may be associated with a single process control system (e.g., the process control system 100) while in other examples the test application manager 101 may manage the testing of a plurality of process control systems.

To generate test applications from a process control routine, the example test application manager 101 of FIG. 2 includes a test application generator 202. The example test application generator 202 may access a process control routine via a communication path 204 to generate a test application. The communication path 204 may include any type of wired and/or wireless communication path communicatively coupled to one or more process control routines.

The example test application generator 202 may create a test application from a routine upon the creation of the routine. In other examples, the test application generator 202 may generate a test application in response to an instruction from a process control operator. The test application generator 202 may generate a test application from a routine by determining test limits based on parameters within the routine. Further, the test application generator 202 may order and/or sequence the tests within the test application based on the order, functions, and/or types of functional blocks in a visual object diagram associated with a routine and/or by the order and/or types of algorithms or processes included within the routine.

Further, the example test application generator 202 may use functions, equations, calculations, and/or algorithms defined within functional blocks to define limits for the corresponding tests. For example, the test application generator 202 may determine limits for a test based on specified values within an algorithm that may trigger certain events based on the specified values. The test application generator 202 may also create sub-tests within tests in cases where an entire test may not be completed and/or verified by one or more events and/or issues within a particular time period. These cases may be defined by process control system designers and/or specified by algorithms used by the test application generator 202 to generate test applications.

Additionally, the test application generator 202 may include identifiers within each test in the test application that may be cross-referenced to locations within the routine. The test application manager 101 (via a test application comparer 206) may then use the cross-referencing of each test to a location in the routine to determine if an issue or event processed by the routine is substantially similar to one or more tests.

Upon creating a test application, the example test application generator 202 may store the test application to a test database 208. The test database 208 may be implemented by Electronically Erasable Programmable Read-Only Memory (EEPROM), Random Access Memory (RAM), Read-Only Memory (ROM), and/or any other type of memory. Additionally, test applications may be accessed by operators through workstations (e.g., the workstation 105) via a communication path 210 that is communicatively coupled to the test database 208. The communication path 210 may include any type of wired and/or wireless communication path.

The example test database 208 may store test applications and associated information including for example, test proof data, dates tests were completed, an identity of an operator that completed a test, a next completion or verification date of a test, etc. Furthermore, the test database 208 may store different versions of a test application, where each version may correspond to different version of a routine. Additionally, each of the tests within a test application stored within the test database 208 may be organized as a sequence of tests. In other examples, each test within a test application may be stored as individual tests grouped by a corresponding test application. Also, the test database 208 may store test plans and/or procedures associated with respective test applications that may be generated to guide an operator through the completion of any uncompleted tests. Further, the test application generator 202 may access other tests within the test database 208 and combine and/or add the other tests to tests within a test application based on a test type.

To modify test applications based on modifications to corresponding process control routines, the example test application manager 101 of FIG. 2 includes a test application modifier 212. The example test application modifier 212 receives an indication that a process control routine has been modified, accesses a corresponding test application in the test database 208, and/or modifies the test application based on the modified process control routine. Additionally, the test application modifier 212 may store the modified test application as a different version than the unmodified test application. The example test application modifier 212 may receive an indication of a modified process control routine via a communication path 214 that may be communicatively coupled to a controller and/or a workstation. The communication path 214 may be implemented by any wired and/or wireless communication path.

In alternative examples, the example test application modifier 212 may monitor process control routines for modifications. Upon detecting one or more modifications, the test application modifier 212 may access the corresponding test application and implement the appropriate changes.

The test application modifier 212 may modify a test application in the same manner that the test application generator 202 utilizes functional blocks, parameters, and/or any other routine information to construct the test application.

Further, when the test application modifier 212 receives an instruction and/or an indication from the test application comparer 206 that a test has been completed, the test application modifier 212 may access the test within the test application in the test database 208 and update the test to indicate the test has been successfully preformed. The test application modifier 212 may update the test by storing to one or more test data fields associated a proof of the test, a time-stamp as to when the test was completed, an identification value of an operator that completed the test, a next execution time for the test, and/or any other information to indicate the test was completed.

To monitor process control applications, the example test application manager 101 of FIG. 2 includes a routine monitor 216. The example routine monitor 216 monitors an operation of a process control routine that may include events, issues, and/or executions of portions of the process control routine. In some examples, the routine monitor 216 may monitor the communication between the controller 106 and the field devices 110*a*-*b* via a communication path 218. Alternatively or additionally, the routine monitor 216 may monitor one or more routines within the controller 106 and/or the workstation 105 via the communication path 218. The communication path 218 may include any type of wired and/or wired communication path.

The example routine monitor 216 may monitor a routine specifically for any events and/or issues and then forward an indication of those events and/or issues to the test application comparer 206. Alternatively, the routine monitor 216 may constantly or periodically monitor one or more routines for processing activity and forward all detected processing activity to the test application comparer 206. Further, the routine monitor 216 may be instructed to monitor portions of a process control routine that may include events that may be substantially similar to a test in a test application. Additionally, the routine monitor 216 may monitor a process control routine for instances of certain functional blocks, parameters, and/or portions of the routine that may be identified or used within a corresponding test application. In some examples, the routine monitor 216 may monitor a process control routine as the process control routine is operating. In other examples, the routine monitor 216 may examine an execution history of a process control routine.

Upon detecting an issue, an event, and/or an execution of a portion of a process control routine, the example routine monitor 216 forwards information or data associated with the issue, the event, and/or the execution of a portion of the process control routine to the test application comparer 206. In other examples, the routine monitor 216 may forward an instruction including the information or data associated with event, the issue and/or an execution of a portion of a process control routine to the test application comparer 206.

To determine if an event, an issue and/or an execution of a portion of a process control routine is substantially similar to one or more tests, the example test application manager 101 of FIG. 2 includes the test application comparer 206. The example test application comparer 206 may determine an issue, an event, and/or an execution of a portion of a process control routine is substantially similar to one or more tests by cross-referencing parameters, field devices, functions, and/or functional blocks that are associated with the event, the issue, and/or the execution of a portion of the process control routine to information included within the one or more tests.

For example, the test application comparer 206 may receive information associated with an event from the routine monitor 216 that includes a parameter identified as OUT_01 having a parameter value of 2.4. The test application comparer 206 may cross-reference the OUT_01 parameter to a test that includes the OUT_01 parameter. The test application comparer 206 may then use the parameter value to determine a sub-test within the test that includes the value 2.4. In other examples, the test application comparer 206 may receive a function from the routine monitor 216 that may be cross-referenced to the same function used to set the limits for a test. Alternatively, the test application comparer 206 may use identifiers in each test that may reference a location in a process control routine to determine if an event and/or an issue corresponds to a test.

Upon determining that an event, an issue, and/or an execution of a portion of the process control routine is substantially similar to a test within a test application, the example test application comparer 206 may determine if a proper mitigation of the issue, the event and/or the portion of the process control routine occurred. The test application comparer 206 may determine a proper mitigation for a test by accessing a data field within the test that includes a specified proper mitigation action. Alternatively, the test application comparer 206 may access a database that includes listings of proper mitigations for each type of event, issue, and/or portion of a process control routine. Further, the test application comparer 206 may determine that a proper mitigation was performed by monitoring a routine to determine if an error flag has been reset and/or by determining if the indication of the event and/or issue is no longer active or present. If the test application comparer 206 determines a proper mitigation did not occur, the test application comparer 206 does not update the test with information indicating a proper mitigation occurred.

If the test application comparer 206 determines a proper mitigation occurred for an issue, an event, and/or a portion of the operation of a process control routine, the test application comparer 206 may then send an indication to the test application modifier 212 to update the test application by indicating the corresponding test was effectively completed. The indication may include proof data of the test, a time-stamp of when the test occurred, a mitigation that occurred, and/or field devices associated with the issue or event. The test application comparer 206 may also determine a new time (e.g., a time period) for the test to be completed and forward this new test time to the test application modifier 212. Alternatively, the test application comparer 206 may access the test database 208 to store the indication of completion of the tests.

The example test application comparer 206 may also receive process control data from a test execution verifier 220 and determine if the data is associated with a proper mitigation and/or a proof of the test. The test application comparer 206 may also determine which tests with which the data may be associated based on parameter identifiers, field device identifiers, and/or functional identifiers that may be included with the data. In examples where an operator may execute one or more tests, the test application comparer 206 may receive process control data associated with the executed tests, determine which tests are associated with the data, and populate test proof and/or proper mitigation data fields with the data.

Further, the test application comparer 206 may periodically examine test applications to determine if there are any tests with an execution time that has expired and/or close to expiring. If one or more tests are detected, the test application comparer 206 may generate a test plan, a test procedure, and/or a work instruction for an operator to execute these tests prior to or by the expiration time. Alternatively, the test application comparer 206 may generate a test plan and/or a test procedure periodically for the tests to be executed within a specified time period.

The example test application comparer 206 may generate a test plan by determining which tests are to be executed. The test application comparer 206 may filter the tests based on the identity of an operator that is to conduct the test. Additionally, the test application comparer 206 may receive operator entered proof data for a test and/or deviation test data and combine this data in the appropriate data fields of the corresponding test. Further, in cases where a test results in a failure, the test application comparer 206 may store a record of the failure to the corresponding test in the test application and/or may generate a failure indication to process control personnel to remedy the failure.

The example test application comparer 206 may determine that one or more tests may be conducted automatically by field devices (e.g. the field devices 110a-b) that may include auto verification and/or self calibrating features. In these examples, the test application comparer 206 may send instructions to these field devices to conduct the self-tests. The test application comparer 206 may then receive the results from the field devices via the test execution verifier 220, determine if the results indicate a passing test, and record the test results in the appropriate data fields of the corresponding test.

To manage the completion of a test plan and/or a test procedure, the example test application manager 101 of FIG. 2 includes a test application processor 224. The example test application processor 224 may receive the test plan from the test application comparer 206 and prompt an operator to execute the tests included within the test plan. The test application processor 224 may communicate with an operator via a communication path 226 that is communicatively coupled to a workstation (e.g., the workstation 105 of FIG. 1). The communication path 226 may include any type of wired and/or wireless communication path.

The test application processor 224 may also prompt the operator for an identification value assigned to the operator. Upon receiving the identification value of the operator, the test application processor 224 may forward this identification value to the test application comparer 206 to determine if the operator is authorized to execute some and/or or all of the test plan. Upon receiving the identification value, the test application comparer 206 may access a training database 228 that includes operator training records to determine the level of training and/or permissions for the operator. The training database 228 may include a training record for each operator. Each training record may include, for example, a training level of an operator, training classes completed by an operator, authorized tests for an operator, authorized process control areas for an operator, prerequisite training to achieve a next training level and/or area, etc.

The training database 228 may be implemented by EEPROM, RAM, ROM, and/or any other type of memory. Further, the records within the training database 228 may be updated by authorized process control personnel via a communication path 230 that may be any type of wired and/or wireless communication path communicatively coupled to a workstation.

Based on the data in the training records, the test application comparer 206 may filter tests within the test plan that the operator is authorized to execute, and/or may withhold the test plan from the operator if the operator is not authorized to execute any tests. Upon determining the tests that an operator is authorized to execute, the test application comparer 206 forwards the test plan to the test application processor 224 to guide the operator through the tests. The test plan may include indications of which tests may be skipped by an operator, which tests may be executed manually by the operator, which tests may be simulated by the operator, which tests may have a deviation in execution by the operator, and/or the execution order for the tests. These indications may be generated by the test application generator 202 based on the corresponding routine and/or entered for each test by a process control system test engineer via the communication path 210.

Upon receiving the test plan, the test application processor 224 may guide the operator through the tests. For some tests, the test application processor 224 may instruct the operator to enter process control data to simulate a test input to test functions within a routine and/or outputs of field devices. The test application processor 224 may forward this entered process control data to the test comparer 206 to be stored to a data field associated with the test as a proof of the test. Further, the test application processor 224 may request process control data to be measured by the operator and/or to be recorded by the operator. Upon receiving this process control data, the test application processor 224 may forward this received process control data to the test comparer 206 to be stored to a data field associated with the test as a proof of the test. For example, to test an input range of the field device 110a of FIG. 1, the test application processor 224 may prompt an operator to execute a test that includes a known pressure to be applied to a sense element of the field device 110a. The test application processor 224 may indicate the specified pressure to the operator, prompt the operator to enter a value of the pressure applied to the field device 110a, and/or may prompt the operator to enter a sensed pressure value reported by the field device 110a. Alternatively, the test execution verifier 220 may receive the sensed pressure value of the field device 110a and forward the value to the test application comparer 206 to be combined with the applied pressure to the field device 110a as a proof of the test.

The example test application processor 224 may include features that allow an operator to simulate process control inputs and/or outputs to verify the operation of functional blocks within a routine. Additionally, simulated inputs may be used to verify the operation of field devices. The test application processor 224 may transmit the simulated values through the communication path 226 to the field devices via the controller 106 and/or to the routine via the workstation 105.

Further, the example test application processor 224 may time-stamp data that is entered by an operator to record a time at which a test is completed. The test application processor 224 may then include the time-stamp in test proof data forwarded to the test application comparer 206. Additionally, the test application processor 224 may forward self-test (e.g., auto test) instructions from the test application comparer 206 to corresponding field devices. Also, in some examples, the test application processor 224 may provide operators a list of training or tasks to be completed for the operator to be authorized to complete a test plan.

To receive process control data associated with executed tests, the example test application manager 101 of FIG. 2 includes the test execution verifier 220. The example test execution verifier 220 may receive process control data by monitoring a routine and/or the LAN 108 of FIG. 1 via a communication path 222 that may include any type of wired and/or wireless communication path. Alternatively, a process control routine, a workstation (e.g., the workstation 105), and/or the controller 106 may transmit process control data to the test execution verifier 220.

The example test execution verifier 220 may monitor for process control data by determining parameters transmitted by field devices and/or functions performed by a routine by identifiers associated with the parameters and/or the functions. For example, the test execution verifier 220 may include a list of parameter identifiers to detect in the routine. Any time the routine receives one of the listed parameters, the test execution verifier 220 may use an identification value of the parameter included within the data to detect the data associated with the parameter. Additionally, the test execution verifier 220 may determine if a routine executed a proper mitigation of an issue by monitoring the portions of the routine associated with the mitigation actions.

The example test execution verifier 220 may receive process control data associated with tests that may be used to automatically verify portions of a process control system. Alternatively, the test execution verifier 220 may receive process control data associated with tests that are being executed by an operator via the test application processor 224. Upon receiving the process control data, the test execution verifier 220 forwards the process control data to the test application comparer 206.

While an example manner of implementing the test application manager 101 is depicted in FIG. 2, one or more of the interfaces, data structures, elements, processes and/or devices illustrated in FIG. 2 may be combined, divided, rearranged, omitted, eliminated and/or implemented in any other way. For example, the example test application generator 202, the example test application comparer 206, the example test application modifier 212, the example routine monitor 216, the example test application processor 224, and/or the example test execution verifier 220 illustrated in FIG. 2 may be implemented separately and/or in any combination using, for example, machine-accessible or readable instructions executed by one or more computing devices and/or computing platforms (e.g., the example processing platform P10 of FIG. 10).

Further, the example test application generator 202, the example test application comparer 206, the example test application modifier 212, the example routine monitor 216, the example test application processor 224, the example test execution verifier 220, and/or more generally, the test application manager 101 may be implemented by hardware, software, firmware and/or any combination of hardware, software and/or firmware. Thus, for example, any of the example test application generator 202, the example test application comparer 206, the example test application modifier 212, the example routine monitor 216, the example test application processor 224, the example test execution verifier 220, and/or more generally, the test application manager 101 can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 3:
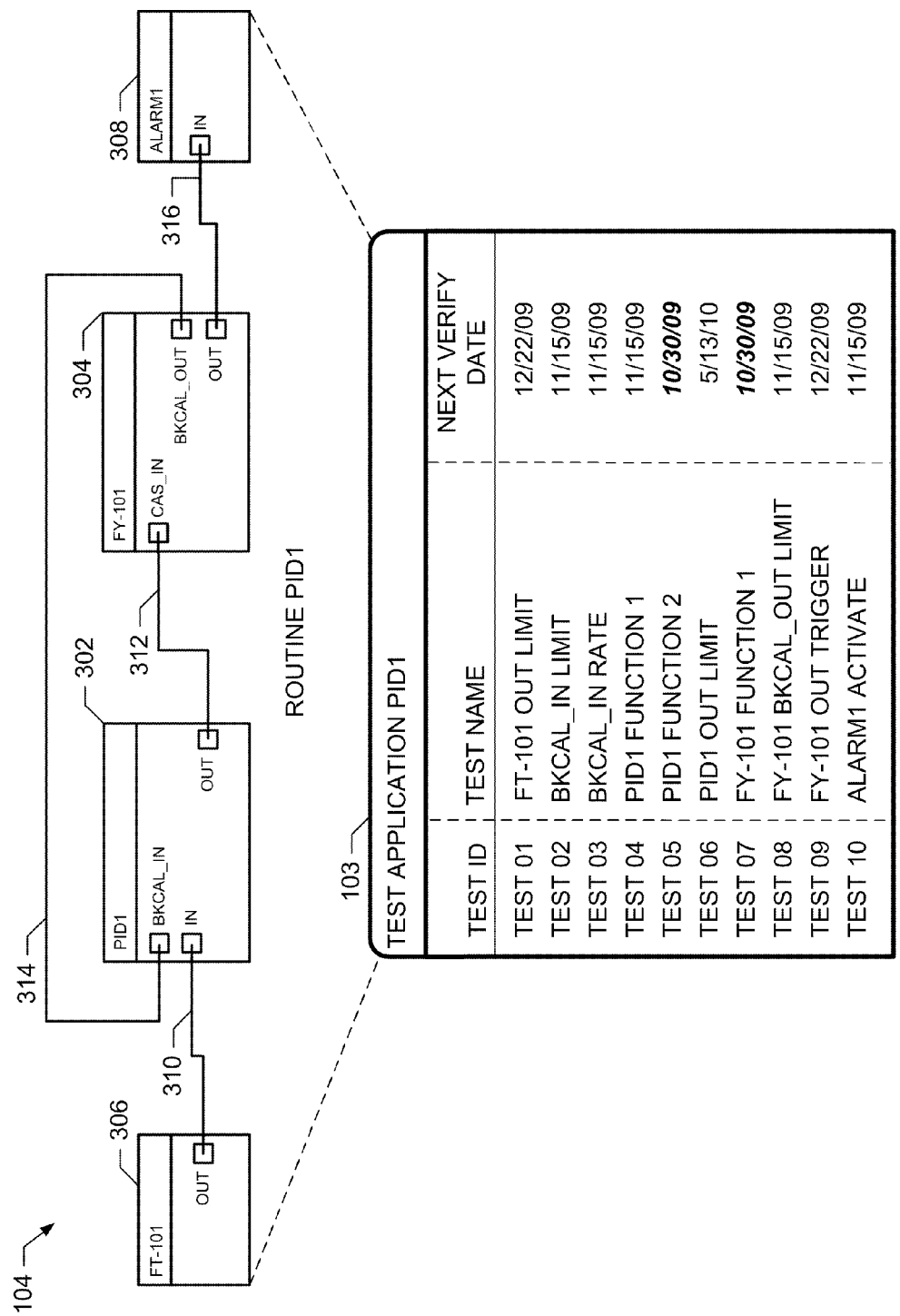
FIG. 3 shows the process control routine and the corresponding test application of FIG. 1.

FIG. 3 shows the visual object diagram 104 of the process control routine 102 and the corresponding test application 103 of FIG. 1. For brevity, the example visual object diagram 104 shows functional blocks 302-308. However, in other examples, the visual object diagram 104 may include additional functional blocks coupled together by additional links. For example, a typical process control system may include dozens of interconnected functional blocks coupled together by links.

The example functional blocks 302-308 are coupled together to implement a proportional-integral-derivative (PID) feedback loop with an alarm. The functional block 302 may include a PID control algorithm and/or routine to calculate an output based on an input value and a feedback value. The output value corresponds to an OUT parameter, the input value corresponds to an IN parameter, and the feedback value corresponds to a BKCAL_IN parameter within the functional block 302. The IN parameter of the functional block 302 is communicatively coupled via a link 310 to an OUT parameter of the functional block 306.

The example functional block 306 may receive a process control data value from one or more field devices and convert the received data into a parameterized value for the PID1 functional block 302. The FT-101 functional block 306 then transmits the value via the OUT parameter to the IN parameter of the PID1 functional block 302. Upon calculating an output value, the PID1 functional block outputs the output value via the OUT parameter via a link 312 to a CAS_IN parameter within the functional block 304. The example functional block 304 may use the output value to calculate a control action and/or a calibration value based on the received output value. The FY-10 functional block 304 may then transmit this control action through an OUT parameter to an IN parameter within the ALARM1 functional block 308 via a link 316. Additionally, the FY-101 functional block 304 may transmit the calibration value through a BKCAL_OUT parameter via a link 314 to a BKCAL_IN parameter within the PID1 functional block 302.

The corresponding test application 103 may be generated from the visual object diagram 104 and/or the corresponding process control routine 102 via the test application generator 202 of FIG. 2. The example test application 103 of FIG. 3 shows example tests that correspond to and/or which may be generated from the functional blocks 302-308 and the associated parameters. For example, TEST 01 may test the limits of the OUT parameter received by and/or generated from the FT-101 functional block. As depicted in FIG. 3, the TEST 01 includes a next verification time (e.g., date) of Dec. 22, 2009, indicating the test should be completed by this date. If the test is not completed by this time through the operation of the process control routine 102, the test application manager 101 may prompt an operator to complete the test. In another example, the TEST 04 test may be generated from a function performed by the PID1 functional block 302. The function to be tested may involve a combination of the BKCAL_IN and the IN parameters in the PID1 functional block 302 to generate the OUT parameter. In yet another example, the TEST 10 test may be generated to test the operation of an alarm via the IN parameter to the ALARM1 functional block 308. This test may determine if the alarm is activated by sending the appropriate value to active the alarm via the IN parameter. In some examples, the test application manager 101 may execute the TEST 10 by simulating an event that triggers an activation of the alarm.

The example test application 103 includes fields for a test identifier, a test name, and a next verification (e.g., completion) time. In the example of FIG. 3, the tests are ordered by test identifier. However, in other examples the tests may be ordered by next verification time and/or by test name.

Alternatively, the tests may be ordered by a test sequence. Further, in other examples, the tests application may include additional fields for test proof data, operator identification of an operator that completed a test, a time a test was last completed, etc. Additionally, the time (e.g., date) of Oct. 30, 2009 is italicized within the next verification date field to indicate the times to complete TEST 05 and TEST 07 are close to expiring.

The test application 103 may be implemented as a manager and/or a processor of the individual tests (e.g., TEST 01-TEST 10). For example, the test application 103 may determine if any tests have a completion or verification time that is close to expiring. Additionally, the test application 103 may manage the storage and/or organization of test completion data including test proof data for each test. In other examples, the test application 103 may include a table and/or chart listing tests associated with the test application 103.

While the example test application 103 of FIG. 3 includes the ten tests (e.g., TEST 01-TEST 10), the test application 103 may include additional tests that may correspond to the visual object diagram 104 and/or the process control routine 102. For example, the test application 103 may include tests to verify the operation of the field devices 110*a-b* and/or the pump 112 of FIG. 1. Further, in examples where the visual object diagram 104 includes additional functional blocks, the example test application 103 may include additional tests corresponding to the additional functional blocks.

FIG. 4 shows the example test application 103 and a test description table 402 for the example test TEST01 of FIG. 3. The example test description table 402 may be included within the test application 103. For example, the TEST 01 may include a link to the test description table 402. The example test description table 402 includes fields for a test identification (e.g., TEST ID), test limits (e.g., TEST), mitigation for each test (e.g., MITIGATION), and a next verification or completion time/date (e.g., NEXT VERIFY DATE). Additionally, the test description table may include additional data fields for a mitigation value, a test proof, and/or a corresponding location of the test in a routine.

For example, the location of a test in a routine field may include a value that specifies a location in a routine that is substantially similar to the test. Alternatively, the location of a test in a routine field may include parameter and/or functional identification values that reference functions and/or parameters within the routine 102. Further, the test description table 402 may include fields to indicate if a test may be operated manually by an operator, fields to indicate if a test may be optional, fields to indicate that a test may have a deviation, and/or fields to indicate a type of detected failure associated with a test.

The example test description table 402 includes sub-tests of the TEST 01. For example, the TEST 01 may test the limit of the OUT parameter of the FT 101 functional block 306 of FIG. 3. The limits for the OUT parameter and the TEST 01 may range from 21.7 to 25.2. However, during the operation of the process control system 100 of FIG. 1, only one side of the limit may be tested at a time. Thus, the TEST 01 is subdivided into a TEST 01H to test the high limit of the range and a TEST 01L to test the low limit of the range.

The TEST 01H test may be determined to be completed if the OUT parameter deviates from the 25.2 limit and the test application manager 101 determines that a proper mitigation occurred. In this case, the proper mitigation includes sending or generating an issue indicator (e.g., INDICATOR 02) and reducing the value of the OUT parameter to below the 25.2 limit within 60 seconds. Similarly, the TEST 01L test may be determined to be completed if the OUT parameter falls below the 21.7 limit and the test application manager 101 determines that a proper mitigation occurred. In this case, the proper mitigation includes sending or generating an issue indicator (e.g., INDICATOR 04) and increasing the value of the OUT parameter to be greater than the 21.7 limit within 60 seconds. Additionally, the TEST 01 includes a communication test (e.g., TEST 01N) that may test the communication between the controller 106 and the corresponding field device that may generate the OUT parameter.

The NEXT VERIFY DATE field shows that each sub-test may be executed independently and have a different completion time. However, the completion time of the TEST 01 test in the test application 103 may reflect the closest date (e.g., Dec. 22, 2009). In addition to test limits, the TEST field may include function variables, test terms, test conditions, and/or any other test definition features. For example, the TEST field for the TEST 04 test may include a definition of the PID1 FUNCTION 1 with corresponding test limits. The test application manager 101 may use the identifiers (e.g., FT-101 and/or OUT) to cross-reference the TEST 01 test to the routine 102 to determine if an event, an issue, and/or a portion of an operation of the routine 102 is substantially similar to the tests TEST 01H, TEST01L and/or TEST 01N.

In examples where an operator is to execute a test, the test description table may be used by the test application manager 101 to generate a test plan. For example, the information in the TEST field may define the terms of a test plan and the information in the MITIGATION field may define the events an operator is to observe and/or record to determine if the issue indicated by the test is mitigated or corrected. Further, each of the sub-tests (e.g., TEST 01H, TEST 01L, and/or TEST 01N) may further be subdivided into sub-tests that may be displayed in other test description tables.

FIG. 5 shows an example verification history table 502 of the example test TEST01L of FIG. 4. The example verification history table 502 may be included with the test description table 402 and/or the test application 103 of FIG. 4. The verification history table 502 shows the test completion history for a single test (e.g., TEST 01L). Other tests may include respective verification history tables.

The example verification history table 502 includes data fields for a time/date the test was completed (e.g., TEST DATE), a version of the test (e.g., TEST VERSION), a test type (e.g., TEST TYPE), a time for the proper mitigation to occur (e.g., MITIGATION TIME), an operator that performed the test (e.g., OPERATOR), and a next verification or completion date (NEXT VERIFY DATE). Additionally, the verification history table 502 may include data fields for test proof data, mitigation data, and/or any other test completion data.

The TEST VERSION field indicates a test version and/or a version of the test application 103. For example, a test version VER. 2.0A may correspond to the test limit range of 21.7 to 25.2 in FIG. 4 while a test version VER. 1.5A may correspond to a previous test limit range of 22.4 to 28.3. The TEST TYPE field includes a listing of the type of test that was executed. For example, a MANUAL test may correspond to a test executed by an operator, an IN PROCESS test may correspond to a test executed during an operation of the process control system and/or routine, an AUTOMATIC test may correspond to a test that was executed by the test application manager 101 while the process control system was stopped or suspended, and/or the SIMULATION test may correspond to a test that used simulated test values instead of process control data to execute the test. In some examples, multiple test types may be executed.

Further, the MITIGATION TIME field includes the time for the proper mitigation to occur. The OPERATOR field shows an identification value of an operator that conducted the test. In an example where the test may have been completed IN PROCESS, the operator may correspond to an operator that was supervising the process control system during an event and/or issue that was substantially similar to the test. The NEXT VERIFY DATE field in the verification history table 502 shows the scheduled next test completed time based on the corresponding date in the TEST DATE field. For example, the TEST 01L may be specified to be completed every six months. Thus, a test completion date of May 15, 2008 may have a next test complete time/date of Nov. 15, 2008. The second line of the verification history table 502 shows that a MANUAL test was completed on an expiration date of Nov. 15, 2008. The fourth line shows that an IN PROCESS test was completed Aug. 14, 2009, which was before the expiration date of Nov. 15, 2009. Thus, because the test occurred during the operation of the process control system (e.g., IN PROCESS), an operator was not needed to execute the test and the test does not need to be completed again until Feb. 14, 2010.

FIG. 6 shows an example operator training record 602 for the process control system 100 and/or the process control routine 102 of FIG. 1. The example operator training record 602 may be used by the test application manager 101 to determine if an operator is authorized to execute one or more tests in a test plan. Additionally, the operator training record 602 may be used to maintain, manage, and/or coordinate operator training with process control tasks. The example operator training record 602 includes data fields for an operator identifier (e.g., OPERATOR ID), a training level of an operator (e.g., TRAINING LEVEL), a date the operator must re-complete training by (e.g., RECERTIFICATION DATE), process control areas an operator may be authorized to test and/or operate (e.g., AUTHORIZED PROCESS CONTROL AREAS), and un-completed training classes (e.g., ASSIGNED TRAINING NOT COMPLETED). Additionally, the operator training record 602 may include other fields such as, for example, a job position of an operator, a department level of an operator, prior training completed, and/or any other fields that may include operator training information.

In examples where the test application manager 101 determines that at least one test should be completed by an operator to ensure the test is completed by an expiration time/date, the test application manager 101 may create a test plan, prompt an operator for an identification value, and determine if the identification value corresponds to a TRAINING LEVEL and/or AUTHORIZED PROCESS CONTROL AREAS that are required to execute the tests in the test plan. For example, the test application manager 101 may generate a test plan for the PID1 routine of FIG. 3. If operator GKL01 attempts to execute the test plan, the test application manager 101 determines that the PID1 routine is included within the AUTHORIZED PROCESS CONTROL AREAS. Alternatively, the test application manager 101 may determine that a test plan corresponds to a LEVEL 4 based on the types of tests in the test plan. Thus, based on the individual operator training records within the operator training record 602, operators with a LEVEL 4 training level or greater (e.g., operator GKL01, EM02, and/or MN04) may execute the test plan. The test application manager 101 may determine a training level for a test plan based on the complexity of tests within the test plan, the process control areas associated with the test plan, and/or may be assigned a training level by process control personnel.

Additionally, the operator training record 602 may be used to indicate to operators training they must complete to ascend to a next higher training level and/or to add another authorized process control area to their record. For example, the operator EM02 may move to a LEVEL 5 training level by completing the PDM 202, PDM 203, and MEMS 432 training classes or procedures.

FIGS. 7, 8, 9A and 9B are flowcharts of example methods that may be carried out to implement the example test application manager 101, the example test application generator 202, the example test application comparer 206, the example test application modifier 212, the example routine monitor 216, the example test application processor 224, and/or the example test execution verifier 220 of FIGS. 1 and/or 2. The example methods of 7, 8, 9A, and/or 9B may be carried out by a processor, a controller and/or any other suitable processing device. For example, the example methods of FIGS. 7, 8, 9A, and/or 9B may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform P10 discussed below in connection with FIG. 10). Combinations of the above are also included within the scope of computer-readable media.

Methods comprise, for example, instructions and/or data that cause a processor, a general-purpose computer, special-purpose computer, or a special-purpose processing machine to implement one or more particular methods. Alternatively, some or all of the example methods of FIGS. 7, 8, 9A, and/or 9B may be implemented using any combination(s) of ASIC(s), PLD(s), FPLD(s), discrete logic, hardware, firmware, etc.

Figure 7:
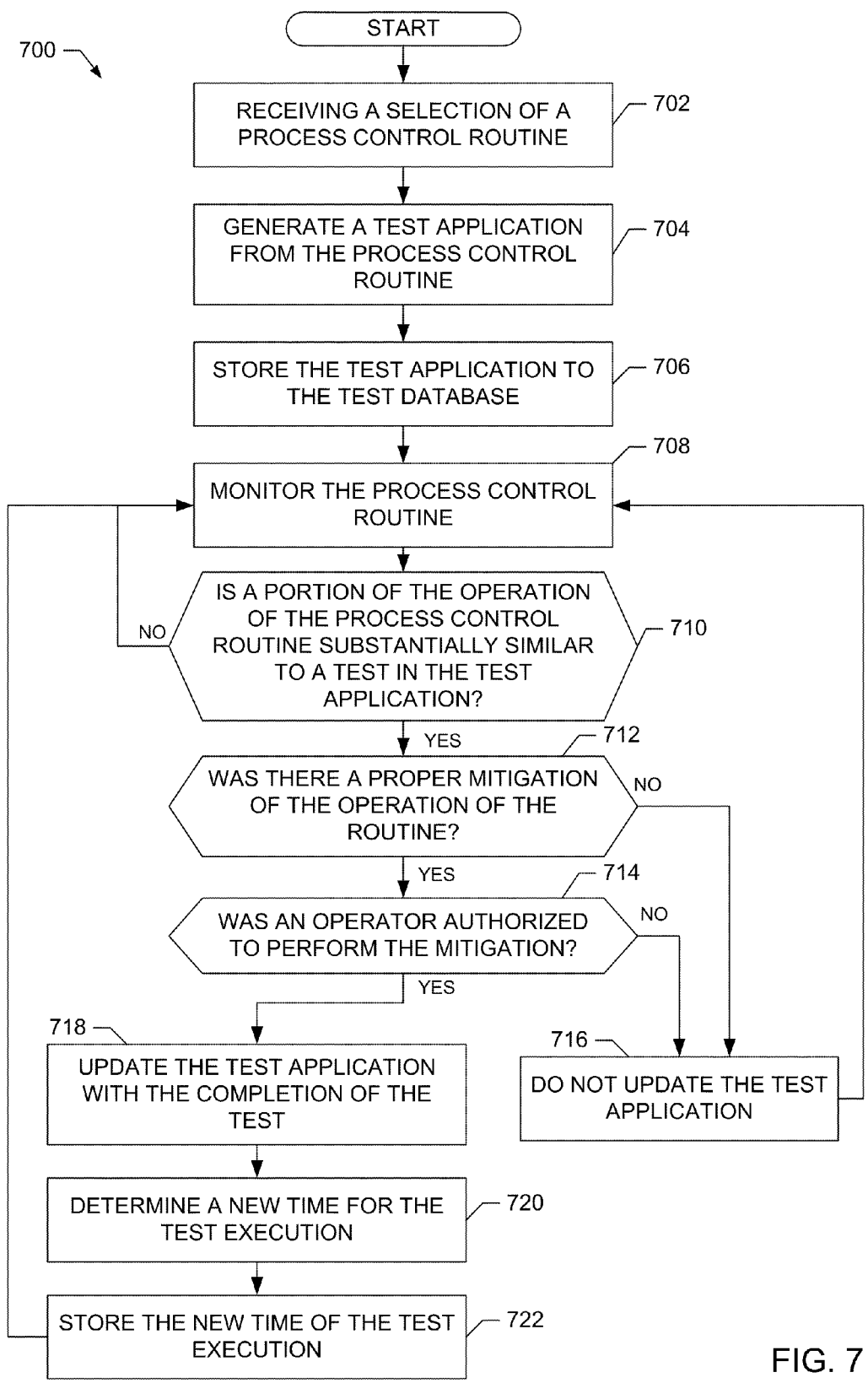
FIGS. 7, 8, 9A, and 9B are flowcharts of example methods that may be used to implement the example test application manager, an example test application generator, an example test application modifier, an example routine monitor, an example test application comparer, an example test execution verifier, and/or an example test application processor of FIGS. 1 and/or 2.
Figure 8:
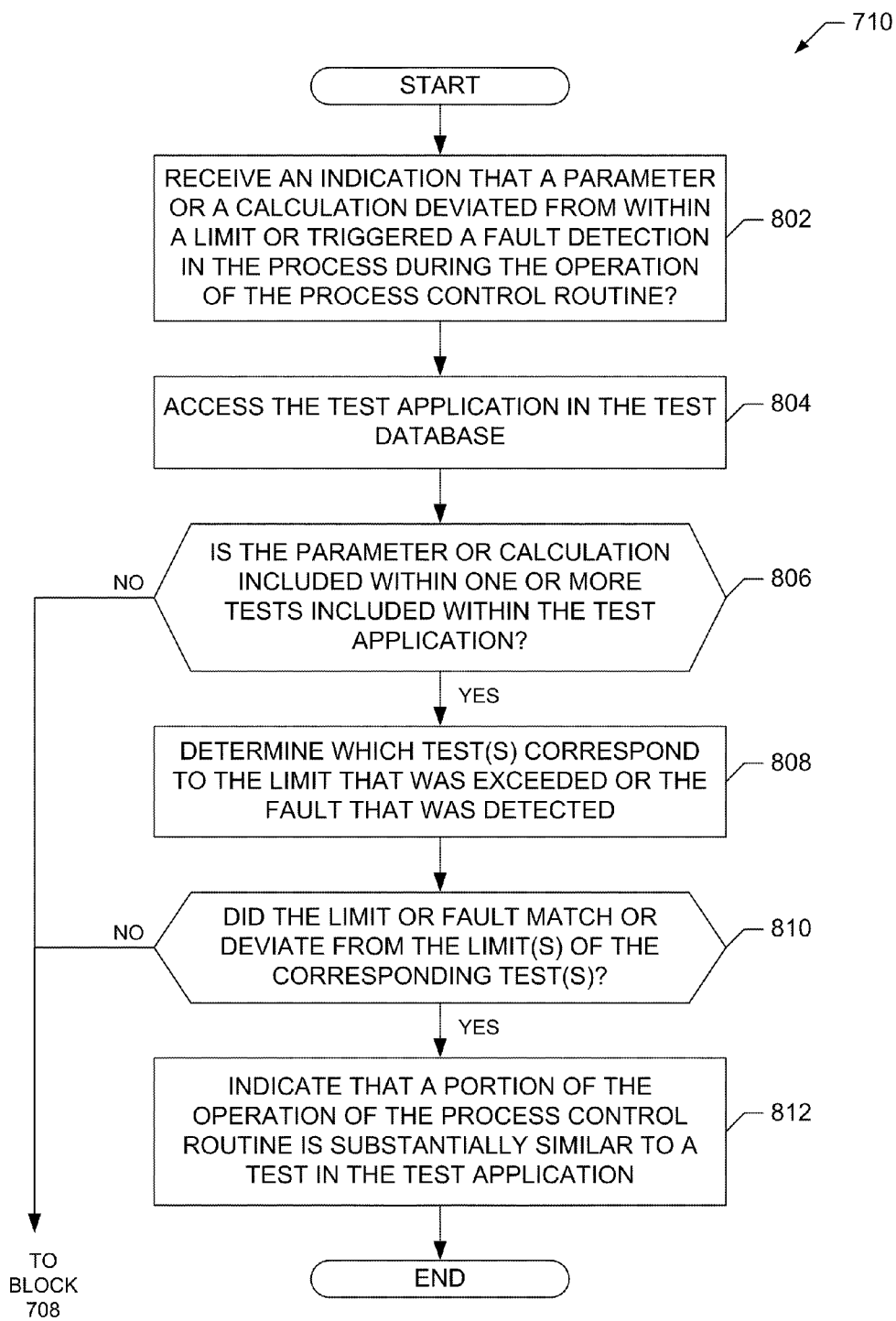
Figure 9A:
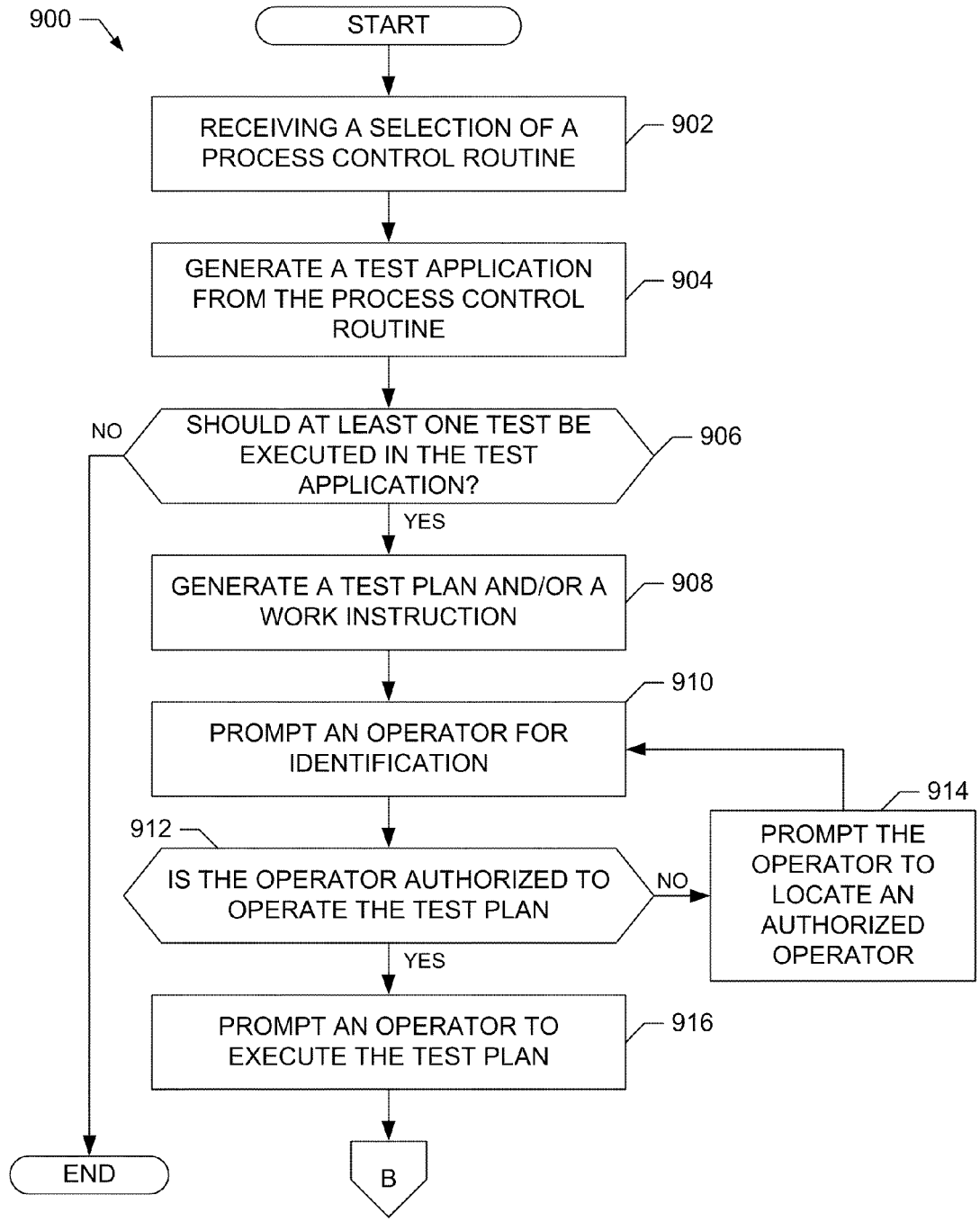

Also, some or all of the example methods of FIGS. 7, 8, 9A, and/or 9B may instead be implemented using manual operations or as any combination of any of the foregoing techniques, for example, any combination of firmware, software, discrete logic and/or hardware. Furthermore, many other methods of implementing the example operations of FIGS. 7, 8, 9A, and/or 9B may be employed. For example, the order of execution of the blocks may be changed, and/or one or more of the blocks described may be changed, eliminated, subdivided, or combined. Additionally, any or all of the example methods of FIGS. 7, 8, 9A, and/or 9B may be carried out sequentially and/or carried out in parallel by, for example, separate processing threads, processors, devices, discrete logic, circuits, etc.

The example method 700 of FIG. 7 updates test applications based on the proper mitigation of issues and/or events that may occur during the operation of a process control system. Multiple example methods 700 may be executed in parallel or series to update multiple test applications associated with respective routines. Additionally, in examples where multiple routines may control a single process control system, an example method 700 may be implemented for each routine or, alternatively, a single example method 700 may be implemented for the process control system.

The example method 700 of FIG. 7 begins by receiving a selection of a process control routine (block 702). The selection may be made by an operator and/or may be made upon a creation of a process control routine. Next, the example method 700 generates a test application from the selected process control routine (block 704) and stores the test application to the test database 208 of FIG. 2 (block 706). The example method 700 then monitors the selected process control routine (block 708). In some examples, some time may pass from the creation of the test application until the routine is monitored. For example, the routine may not be monitored until the process control system is commissioned or operational.

The example method 700 continues by determining if a portion of the operation of the process control routine is substantially similar to one or more tests in the test application (block 710). The example method 700 may also determine if an event and/or an issue is substantially similar to a test within the test application. If a portion of the operation of the routine is not substantially similar to at least one test, the example method 700 continues by monitoring the process control routine (block 708). However, if a portion of the operation of the routine is substantially similar to at least one test, the example method 700 determines if there was a proper mitigation of the portion of the operation of the routine (block 712). A proper mitigation may include one or more actions implemented by the process control routine to cause the at least one test to be within specified threshold(s). Further, even if a portion of the operation of the routine is substantially similar to at least one test, the example method 700 may still continue to monitor the process control routine (block 708) for other portions of the routine, events and/or issues that may be substantially similar to other tests (not shown).

If the example method 700 determines a proper mitigation did not occur within the process control system and/or the routine, the example method 700 does not update the test application (block 716) and continues to monitor the process control routine (block 708). However, if the example method 700 determines a proper mitigation occurred within the process control system and/or the routine, the example method 700 determines if an operator was authorized to perform the mitigation (block 714).

In examples where the routine and/or the process control system automatically executes the proper mitigation without the assistance of an operator, the example method 700 continues by updating the test application with information associated with the completion of the test (e.g., test proof information) (block 718). Likewise, if an operator was authorized to perform the mitigation, the example method updates the test application (block 718). However, in examples where the example method 700 determines an operator was not authorized to perform the mitigation, the example method 700 does not update the test application (block 716) and continues to monitor the process control routine (block 708). Alternatively, in some examples where an operator was not authorized to perform the mitigation, the example method 700 may prompt an operator with authority to perform the mitigation to verify the work of the other unauthorized operator. The example method 700 may determine if an operator is authorized to execute a mitigation of an event and/or an issue by accessing a corresponding operator training record in the training database 228 of FIG. 2.

The example method 700 continues by upon updating the test application, determining a new time (e.g., time period for the test to be executed) (block 720). For example, in cases where a test is to be executed every six months, the example method 700 may set the new time to a date and/or time that is six months away from the current date. The example method 700 then stores the new time for the test (block 722) and continues to monitor the process control routine (block 708). The example method 700 may be ended by an operator and/or may end when the process control routine and/or process control system is stopped.

The example method 710 of FIG. 8 determines if a portion of the operation of the process control routine of FIG. 7 is substantially similar to at least one test in the test application. The example method 710 shows a detailed process of the example method 700 during the execution of block 710 in FIG. 7. The example method 710 of FIG. 8 begins by receiving an indication that a parameter, an algorithm, a function, and/or a calculation deviated from within a limit and/or triggered a fault detection in the process control system during the operation of the process control routine (block 802). In other examples, the example method 710 may receive an indication of any activity associated with the routine.

The example method 710 then accesses the test application within the test database 208 (block 804). Next, the example method 710 determines if the parameter, algorithm, function, and/or calculation included within the one or more tests are part of the test application (block 806). The example method 710 may determine if the parameter, algorithm, function, and/or calculation is included within one or more tests by cross-referencing any identifiers associated with the parameter, algorithm, function, and/or calculation to terms, variables, and/or limits within the tests. Alternatively, the example method 710 may determine if one or more of the tests includes a reference to a location within the routine matches the parameter, algorithm, function, and/or calculation.

If the example method 710 is not able to determine that at least one test matches the parameter, algorithm, function, and/or calculation, the example method 710 continues to monitor the process control routine (block 708 of FIG. 7). However, if the example method 700 determines that at least one test corresponds to the parameter, algorithm, function, and/or calculation, the example method determines which of the test(s) correspond to the parameter, algorithm, function, and/or calculation that deviated from within the limit or triggered the fault (block 808).

The example method 710 then determines if the deviated limit and/or detected fault matches and/or exceeds the limit(s) of the corresponding test(s) (block 810). For example, the example method 710 may determine that a field device received an input of 4 bar that deviated from within a process functional limit of 5 bar. However, if the test is valid for inputs from 0.5 bar to 2 bar, the parameter value of 4 bars does not deviate from the test limit and the example method 710 does not update the test as completed. In another example, if the field device receives an input of 2 bar that deviates from within a process control routine functional limit of 5 bars, the example method 710 indicates the test is substantially similar to the event because the parameter value also deviates from the test limit value of 2.5 bar. Upon determining that the limit or fault matched or deviated from within the limit(s) of the corresponding test(s), the example method 710 continues by indicating that a portion of the operation of the process control routine is substantially similar to at least one test in the test application (block 812). The example method 710 then ends.

Figure 9B:
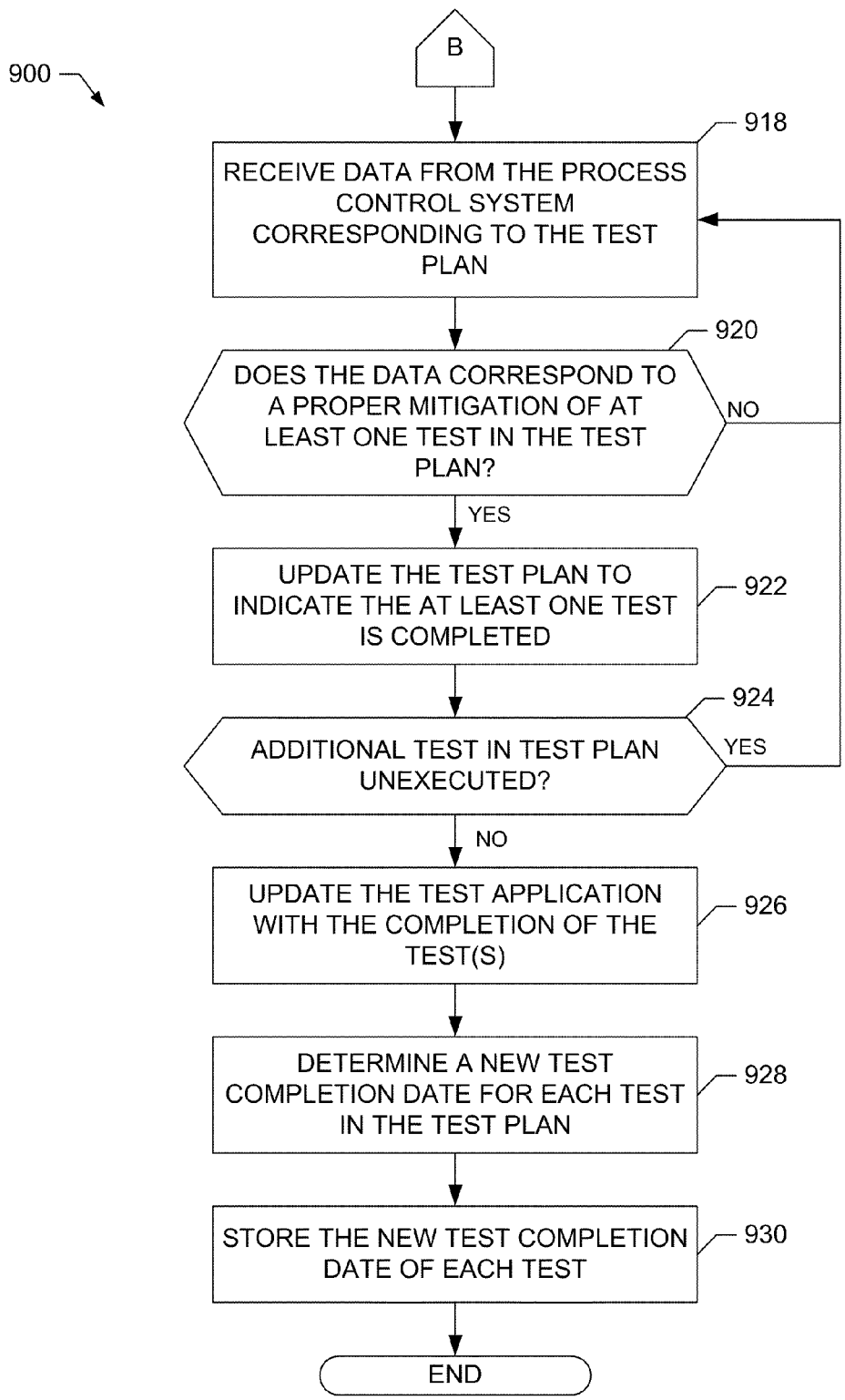

The example method 900 of FIGS. 9A and 9B manage the completion of tests by a process control operator. Multiple example methods 900 may be executed in parallel or series to update multiple test applications associated with respective routines. Additionally, in examples where multiple routines may control a single process control system, an example method 900 may be implemented for each routine or, alternatively, a single example method 800 may be implemented for the process control system. Further, an example method 900 may be performed for each operator that executes a test within a test application.

The example method 900 of FIG. 9A begins by receiving a selection of a process control routine (block 902). The process control routine may be selected by an operator to execute any tests that have expired and/or which have near-expiring test completion times. The example method 900 then generates a test application from the selected process control routine (block 904) and determines if at least one test should be executed in the test application (block 906). The example method 900 may determine if at least one test should be executed by determining if any tests have an approaching or expired verification time and/or execution time. If the example method 900 determines that there are no tests to be executed by an operator, the example method 900 ends.

However, if the example method 900 determines that at least one test is to be executed by an operator, the example method 900 generates a test plan, a test procedure, and/or a work instruction (block 908). Next, the example method 900 may prompt an operator for identification (block 910). The example method 900 may then receive the identification associated with the operator and determine if the operator is authorized to operate and/or execute the test plan (block 912). The example method 900 may determine if the operator is authorized by accessing a training record of the operator. If the operator is not authorized to execute the test plan, the example method 900 may prompt the operator to locate an authorized operator to execute the test plan (block 914) and then prompt the authorized operator for identification (block 910). Alternatively, the example method 900 may filter the test plan and allow the operator to execute tests within the plan that the operator is authorized to execute.

If the operator is authorized to execute the test plan (block 912), the example method 900 continues by prompting the operator to execute the test plan (block 916). In some examples, the example method 900 may manage the executing of the test plan to ensure the operator follows a defined sequence of tests and/or to ensure the operator correctly perform each test. Additionally, the example method 900 may prompt the operator for test proof data.

Next, the example method 900 of FIG. 9B continues by receiving data from the process control system that corresponds to the tests executed by the operator (block 918). The received data may be detected during the operation of the routine, may be entered by the operator, and/or may be provided directly by field devices and/or a controller within the process control system. The example method 900 then determines if the received data corresponds to a proper mitigation of at least one test in the test plan (block 920).

The example method 900 may determine if the received data corresponds to a proper mitigation by cross-referencing the data and/or identifiers associated with the data to a proper mitigation field associated with each of the tests. If the data does not correspond to a proper mitigation, the example method 900 may continue to receive data from the process control system (block 918). Additionally, even if the data corresponds to a proper mitigation, the example method 900 may continue to receive data from the process control system (block 918). Further, if the data corresponds to a proper mitigation, the example method determines which test(s) correspond to the data and updates the test plan to indicate the corresponding test(s) have been completed (e.g., that the portion of the process control routine is verified) (block 922). The indication may include test proof information, a time a test was completed, the identification value of the operator that performed the test, the results of the proper mitigation, etc.

The example method 900 of FIG. 9B continues by determining if there are any additional tests in the test plan that have not been executed by the operator (block 924). If there are additional tests, the example method 900 continues to receive data from the process control system (block 918). However, if there are no additional tests to be executed, the example method 900 updates the test application with information associated with the completed test(s) (block 926). The example method 900 may then determine a new test completion date for each completed test (block 928). The example method then stores the new test completion date for each test in the test application (block 930) and the example method 900 ends.

Figure 10:
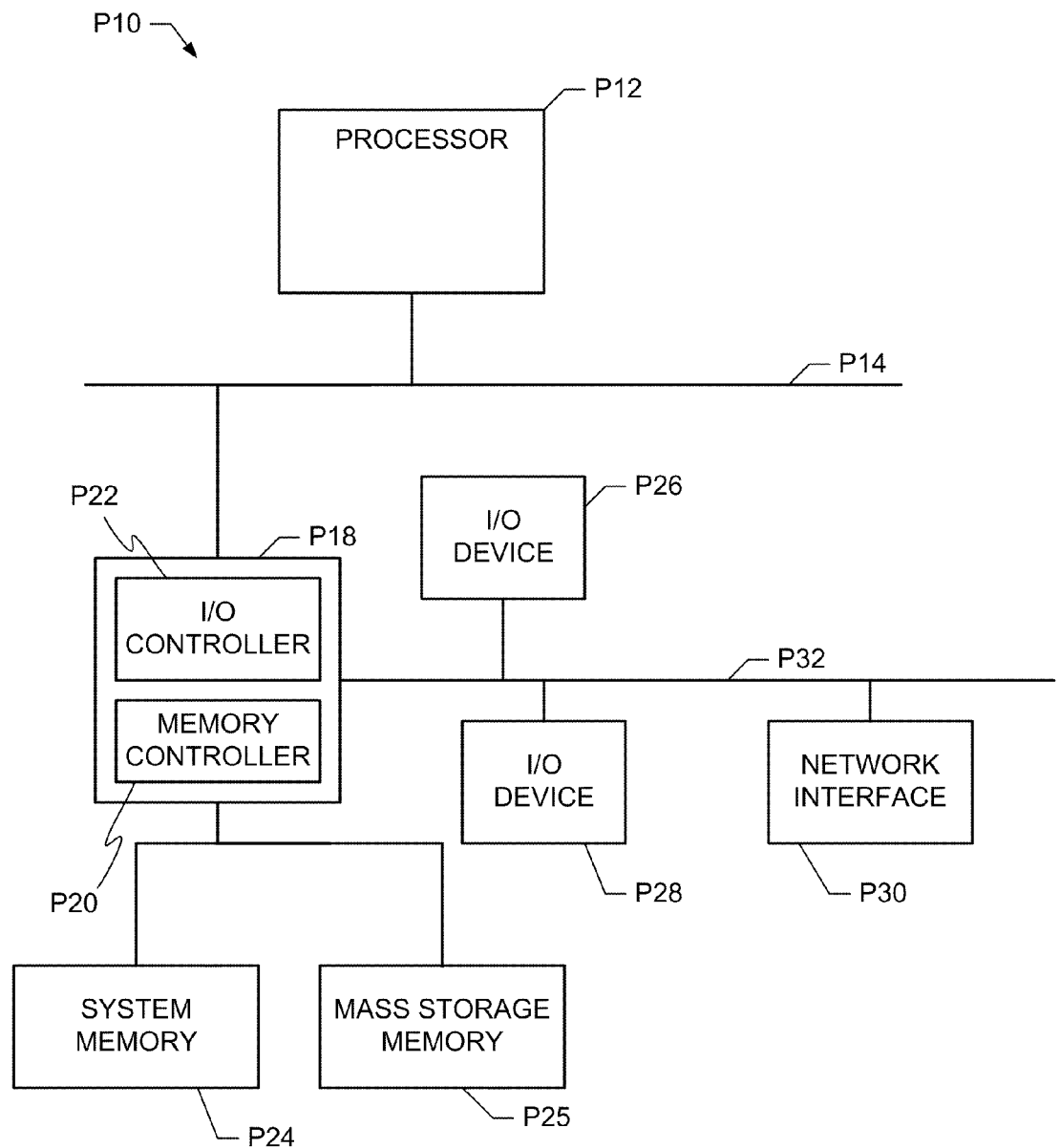
FIG. 10 is a block diagram of an example processor system that may be used to implement the example methods and apparatus described herein.

FIG. 10 is a block diagram of an example processor system P10 that may be used to implement the example methods and apparatus described herein. For example, processor systems similar or identical to the example processor system P10 may be used to implement the example test application manager 101, the example test application generator 202, the example test application comparer 206, the example test application modifier 212, the example test application processor 224, and/or the example test execution verifier 220 of FIGS. 1 and/or 2. Although the example processor system P10 is described below as including a plurality of peripherals, interfaces, chips, memories, etc., one or more of those elements may be omitted from other example processor systems used to implement one or more of the example test application manager 101, the example test application generator 202, the example test application comparer 206, the example test application modifier 212, the example test application processor 224, and/or the example test execution verifier 220.

As shown in FIG. 10, the processor system P10 includes a processor P12 that is coupled to an interconnection bus P14. The processor P12 includes a register set or register space P16, which is depicted in FIG. 10 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 10, the system P10 may be a multi-processor system and, thus, may include one or more additional processors that are identical or similar to the processor P12 and that are communicatively coupled to the interconnection bus P14.

The processor P12 of FIG. 10 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the test application manager 101 (FIG. 2), the mass storage memory P25 may include a hard disk drive, an optical drive, a tape storage device, etc. Alternatively, if the example processor system P10 is used to implement the test database 208 and/or the training database 228, the mass storage memory P25 may include a solid-state memory (e.g., a flash memory, a RAM memory, etc.), a magnetic memory (e.g., a hard drive), or any other memory suitable for mass storage in the test database 208 and/or the training database 228.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 10 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), Hyper-Text Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to manage testing of a process control system, the method comprising:
generating, via a processor, a test application from a process control routine, the test application including a test to be performed during suspension of an operation of the process control routine;
monitoring, via the processor, the operation of the process control routine;
reducing a time consumed by the test application for performing the test by determining, via the processor, if the operation of the process control routine during operation of the process control system includes an execution of a portion of the process control routine that is within a threshold range of the test;
when the execution of the portion results in a first mitigation event indicative of a successful correction based on the threshold range, updating, via the processor, the test application with a first status indicative of a verified test; and
when the execution of the portion results in a second mitigation event indicative of an unsuccessful correction based on the threshold range, updating, via the processor, the test application with a second status indicative of an unverified test.

2. A method as defined in claim 1, further comprising:
when the execution of the portion results in the first mitigation event, indicating that the test is to be performed within a future time period.

3. A method as defined in claim 1, wherein the first mitigation event includes a specified process control response to correct an issue within the process control system.

4. A method as defined in claim 1, further comprising:
when the execution of the portion results in the first mitigation event, time-stamping the test; and
storing to a test record at least one of the first mitigation event, the time-stamp of the test, or the test.

5. A method as defined in claim 1, wherein generating the test application from the process control routine includes at least one of:

determining a test limit based on at least one parameter within the process control routine;
ordering a sequence of the test based on an order of instructions within the process control routine; or
ordering the sequence of the test based on a type of a function within the process control routine.

6. A method as defined in claim 1, further comprising:
receiving a modification to the process control routine;
modifying the test application based on the modification; and
storing the modified test application as another version of the test application.

7. A method as defined in claim 1, further comprising:
generating a test plan from the test application including the test;
prompting an operator to execute the test included within the test plan;
receiving at least one of data associated with the test plan or data associated with the test application;
determining if the received data corresponds to the first mitigation event; and
updating the test plan with the first status.

8. A method as defined in claim 7, further comprising:
prompting the operator for an identification value;
receiving the identification value;
accessing a database of personnel training records;
determining if a training record corresponding to the identification value includes an indication the operator is allowed to perform the test plan; and
allowing the operator to execute the test plan.

9. A method as defined in claim 7, further comprising:
combining results of the test plan with the test application to create a test record;
time-stamping the test record with a time at which the test was completed;
determining if the test associated with the test application has been completed; and
if the test has not been completed, updating the test application with the second status.

10. An apparatus to manage testing of a process control system, the apparatus comprising:
a routine monitor to monitor an operation of a process control routine;
a test application comparer to reduce a time consumed by a test application for performing a test that is included within the test application, the test to be performed during suspension of the operation of the process control routine, by determining if the operation of the process control routine during operation of the process control system includes an execution of a portion of the process control routine that is within a threshold range of the test; and
a test application modifier to:
when the execution of the portion results in a first mitigation event indicative of a successful correction based on the threshold range, update the test application with a first status indicative of a verified test; and
when the execution of the portion results in a second mitigation event indicative of an unsuccessful correction based on the threshold range, update the test application with a second status indicative of an unverified test, at least one of the routine monitor, the test application comparer, or the test application modifier comprising a logic circuit.

11. An apparatus as defined in claim 10, further comprising a test application generator to generate the test application from the process control routine.

12. An apparatus as defined in claim 11, wherein the test application generator is to generate the test application from the process control routine by at least one of:
determining a test limit based on at least one parameter within the process control routine;
ordering a sequence of the test based on an order of instructions within the process control routine; or
ordering the sequence of the test based on a type of a function within the process control routine.

13. An apparatus as defined in claim 11, wherein the test application generator is to generate a test plan from the test application including the test.

14. An apparatus as defined in claim 13, further comprising:
a test application processor to:
prompt an operator to execute the test included within the test plan;
prompt the operator for an identification value;
receive the identification value; and
a test execution verifier to receive at least one of data associated with the test plan or data associated with the test application.

15. An apparatus as defined in claim 14, wherein the test application comparer is to:
determine if the received data corresponds to the first mitigation event;
access a database of personnel training records;
determine if a training record corresponding to the identification value includes an indication the operator is allowed to perform the test plan;
allow the operator to execute the test plan;
combine results of the test plan with the test application to create a test record; and
determine if the test associated with the test application has been completed.

16. An apparatus as defined in claim 15, wherein the test application modifier is to:
update the test plan with the first status if the test application has been completed; and
time-stamp the test record with a time at which the test was completed.

17. An apparatus as defined in claim 16, wherein the test application modifier is to update the test application with the second status if the test has not been completed.

18. An apparatus as defined in claim 10, wherein the test application comparer is to optimize test time by skipping the test when the test application is associated with the second status.

19. An apparatus as defined in claim 10, wherein when the execution of the portion results in the first mitigation event, the test application modifier is to at least one of:
indicate that the test is to be performed within a future time period;
time-stamp the test; or
store to a test record at least one of the first mitigation event, the time-stamp of the test, or the test.

20. An apparatus as defined in claim 10, wherein the first mitigation event includes a specified process control response to correct an issue within the process control system.

21. An apparatus as defined in claim 10, wherein the test application modifier is to:
    receive a modification to the process control routine;
    modify the test application based on the modification; and
    store the modified test application as another version of the test application.

22. A non-transitory machine readable storage device or storage disc having instructions stored thereon that, when executed, cause a machine to:
    generate a test application from a process control routine, the test application including a test that is to be performed during suspension of an operation of the process control routine;
    monitor the operation of the process control routine;
    reduce a time consumed by the test application for performing the test by determining if the operation of the process control routine during operation of the process control system includes an execution of a portion of the process control routine that is within a threshold range of the test;
    when the execution of the portion results in a first mitigation event indicative of a successful correction based on the threshold range, update the test application with a first status indicative of a verified test; and
    when the execution of the portion results in a second mitigation event indicative of an unsuccessful correction based on the threshold range, update the test application with a second status indicative of an unverified test.

23. A machine readable storage device or storage disc as defined in claim 22, wherein the instructions, when executed, cause the machine to:
    when the execution of the portion results in the first mitigation event, indicate that the test is to be performed within a future time period.

24. A machine readable storage device or storage disc as defined in claim 22, wherein the first mitigation event includes a specified process control response to correct an issue within the process control system.

25. A machine readable storage device or storage disc as defined in claim 23, wherein the instructions, when executed, cause the machine to:
    when the execution of the portion results in the first mitigation event, time-stamp the test; and
    store to a test record at least one of the first mitigation event, the time-stamp of the test, or the test.

26. A machine readable storage device or storage disc as defined in claim 22, wherein the instructions, when executed, cause the machine to generate the test application from the process control routine by at least one of:
    determining a test limit based on at least one parameter within the process control routine;
    ordering a sequence of the test based on an order of instructions within the process control routine; or
    ordering the sequence of the test based on a type of a function within the process control routine.

27. A machine readable storage device or storage disc as defined in claim 22, wherein the instructions, when executed, cause the machine to:
    receive a modification to the process control routine;
    modify the test application based on the modification; and
    store the modified test application as another version of the test application.

28. A machine readable storage device or storage disc as defined in claim 22, wherein the instructions, when executed, cause the machine to:
    generate a test plan from the test application including the test;
    prompt an operator to execute the test included within the test plan;
    receive at least one of data associated with the test plan or data associated with the test application;
    determine if the received data corresponds to the first mitigation event; and
    if the received data corresponds to the first mitigation event, update the test plan with the first status.

29. A machine readable storage device or storage disc as defined in claim 28, wherein the instructions, when executed, cause the machine to:
    prompt the operator for an identification value;
    receive the identification value;
    access a database of personnel training records;
    determine if a training record corresponding to the identification value includes an indication the operator is allowed to perform the test plan; and
    allow the operator to execute the test plan.

30. A machine readable storage device or storage disc as defined in claim 28, wherein the instructions, when executed, cause the machine to:
    combine results of the test plan with the test application to create a test record;
    time-stamp the test record with a time at which the test was completed;
    determine if the test associated with the test application has been completed; and
    if the test has not been completed, update the test application with the second status.

31. A method as defined in claim 1, further comprising optimizing test time by skipping the test when the test application is associated with the second status.

32. A machine readable storage device or storage disc as defined in claim 22, wherein the instructions, when executed, cause the machine to optimize test time by causing the machine to skip the test when the test application is associated with the second status.

33. A method as defined in claim 3, further comprising determining whether the first mitigation event includes the specified process control response to correct the issue within the process control system by determining if an indication of the issue has been reset by the process control routine.

34. A method as defined in claim 1, wherein a successful correction comprises adjusting a parameter value associated with the process control routine within the threshold range.

35. A method of claim 34, wherein the parameter value is an input measured by a field device associated with the process control routine.

36. A method as defined in claim 1, wherein the threshold range includes a first range and a second range, and further comprising updating the test application with the first status when the execution of the portion results in the first mitigation event indicative of the successful correction based on the threshold range satisfying both the first range and the second range.

37. A method as defined in claim 1, wherein the test includes a first test and a second test and the determining further includes determining if the execution of the portion of the process control routine results in an input that is within a threshold range of the first test or a threshold range of the second test.

* * * * *